(12) United States Patent
Kurimoto et al.

(10) Patent No.: US 7,142,507 B1
(45) Date of Patent: Nov. 28, 2006

(54) TRAFFIC MONITORING EQUIPMENT AND SYSTEM AND METHOD FOR DATAGRAM TRANSFER

(75) Inventors: Takashi Kurimoto, Hachioji (JP); Takashi Shimizu, Yokohama (JP); Ikuo Yamasaki, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/510,349

(22) Filed: Feb. 22, 2000

(30) Foreign Application Priority Data

Feb. 25, 1999 (JP) .................................. 11-049215
Apr. 16, 1999 (JP) .................................. 11-110152

(51) Int. Cl.
*H04L 12/54* (2006.01)
(52) U.S. Cl. .................. 370/229; 370/232; 370/412; 370/429
(58) Field of Classification Search ................ 370/229, 370/232, 233, 234, 235, 252, 253, 412, 428, 370/429, 465, 468, 469, 470, 471
See application file for complete search history.

(56) References Cited

U.S. PATENT DOCUMENTS

| | | | | |
|---|---|---|---|---|
| 4,414,620 | A | * 11/1983 | Tsuchimoto et al. | ........ 709/217 |
| 4,769,810 | A | 9/1988 | Eckberg et al. | ............... 370/60 |
| 5,280,483 | A | * 1/1994 | Kamoi et al. | ................ 370/234 |
| 5,682,460 | A | * 10/1997 | Hyziak et al. | ............... 395/600 |
| 6,118,761 | A | * 9/2000 | Kalkunte et al. | ........... 370/229 |
| 6,160,793 | A | * 12/2000 | Ghani et al. | ................ 370/236 |
| 6,301,242 | B1 | * 10/2001 | Lindsay et al. | ............. 370/347 |
| 6,483,805 | B1 | * 11/2002 | Daview et al. | ............. 370/235 |
| 6,510,162 | B1 | * 1/2003 | Fijolek et al. | ............... 370/432 |

FOREIGN PATENT DOCUMENTS

| | | |
|---|---|---|
| JP | 04-156026 | 5/1992 |
| JP | 07-058774 | 3/1995 |
| JP | 08-070334 | 3/1996 |
| JP | 08-161244 | 6/1996 |

OTHER PUBLICATIONS

Kumar, V., et al., "Beyond Best Effort: Router Architectures for the Differentiated Services of Tomorrow's Internet," IEEE Communications Magazine, 0163/6804, May 1998: 152-164.
Lucent Technologies, "GRF Product Family," Lucent Technologies, Inc., 1999: 0-8.

(Continued)

*Primary Examiner*—Ricky Q. Ngo
*Assistant Examiner*—Shick Hom
(74) *Attorney, Agent, or Firm*—Thelen Reid & Priest LLP

(57) ABSTRACT

The purpose of the present invention is to provide a datagram transfer network that can operate stably by avoiding a state of congestion collapse by utilizing information derived from evaluating the impact of datagrams on the operation of the network. To achieve this objective, the results of evaluation is expressed as a preference value related to datagrams, and are inserted in the header in each datagram so that the datagrams are processed by an approach other than the methods based on arrival sequence of datagrams, when derived to the destination indicated in the header. In this approach, datagrams are protocol is controlled by priority order derived from the preference value which reflects traffic information obtained by a traffic monitoring equipment.

19 Claims, 17 Drawing Sheets

OTHER PUBLICATIONS

Floyd, S. et al., "Random Early Detection Gateways for Congestion Avoidance," IEEE/ACM Transactions on Networking, vol. 1, No. 4, Aug. 1993: 397-413.

Shimizu, et al,, "ATM Block Transfer Technique for Connectionless Networks", The Institute of Electronics Information and Communication Engineers, Technical Report of IEICE, pp. 45-52 (Dec. 19, 1997).

Kurimoto, et al., "The behavior of TCP connections in ATM block Transfer Network", The Institute of Electronics, Information and Communication Engineers, Technical Report of IEICE, pp. 33-38, (Dec. 19, 1997).

Kurimoto, e t al., "Maximal Network for Best Effort Services with Fair Availability", IEEE, pp. 638-645 (1998).

Kurimoto, et al., "The study of bandwidth allocation mechanism that encourages users to use rate control in best effort service", The Institute of Electronics, Information and Communication Engineers, Technical Report of IEICE, pp. 29-35 (Apr. 19, 1999).

Hari Adiseshu et al., "A State Management Protocol for IntServ, DiffServ and Label Switching", 1998, Proceedings, Sixth International Conference on Network Protocols, Oct. 13-16, 1998.

Lihong Wei et al., "Resource Management in MPLS Applied ATM Network", ICCT '98, Oct. 22-24, 1998.

Yutaka Ezaki et al., "Viewing Approaches to a Large Scale Internet Backbone with ATM Technology", GLOBECOM 98, 1998.

Clark et al., "Explicit Allocation of Best-Effort Packet Delivery Service", Aug. 1998, IEEE/ACM Transactions on Networking, vol. 6, No. 4, pp. 362-373.

Stoica et al., "Core-Stateless Fair Queueing: Achieving Approximately Fair Bandwidth Allocations in High Speed Networks", Oct. 1998, Computer Communications Review, Association for Computing Machinery, New York, US, vol. 28, No. 4, pp. 118-130.

Kumar, et al., "Beyond Best Effort: Router Architectures for the Differentiated Services of Tomorrow's Internet", May 1998, IEEE Communications Magazine, pp. 152-164.

Office Action from the Canadian Intellectual Property Office, dated Dec. 9, 2004, for Canadian Application No. 2,299,177.

* cited by examiner

| LINK PROPAGATION DELAY [ms] | AVERAGE VALUE OF MONITORED MEDIAN [Mbps] |
|---|---|
| 4 | 1.03E+06 |
| 20 | 1.02E+06 |
| 40 | 1.02E+06 |
| 60 | 1.04E+06 |
| 80 | 1.04E+05 |

TRAFFIC MONITORING EQUIPMENT AND SYSTEM AND METHOD FOR DATAGRAM TRANSFER

BACKGROUND OF THE INVENTION

1. Field of the Invention

The present invention relates to a traffic monitoring equipment for use in providing best-effort type communication services through public networks for supporting computer-to-computer highspeed data communications, a system to provide such services and a method for datagram transfer.

2. Description of the Related Art

Data units whose delivery through a network is not guaranteed, such as the internet protocol packets used in the Internet, are called datagrams. The network for providing communication services by means of transferring the datagrams is called datagram transfer network. The system for realizing the datagram transfer network is called datagram transfer system. In such a datagram transfer system, a datagram transmission node (it is equivalent to the router used in the Internet, for example), is used to forward a datagram of a certain length according to the destination address given in the header of the datagram. In such a datagram transmission node, when datagrams of a volume exceeding its processing capacity are received in a very short time interval (such state is known as congestion), received datagrams are discarded regardlessly. For this reason, the datagram transfer network can only provide best-effort type communication services within the framework of "the network aims to deliver individual datagrams to their intended destination address on a best-effort basis within the capability of the transfer devices operating within the network".

FIG. 19 shows a block diagram of the general configuration of a datagram transmission node used in the conventional network described above, which includes a plurality of incoming interface sections (referred to as incoming I/F sections hereinbelow) 1, a plurality of outgoing interface sections (referred to as outgoing I/F sections hereinbelow) 2, both of which are connected to a back plane switch section 3. The back plane switch section 3 is able to transfer datagrams from any incoming I/F section 1 to any outgoing I/F section 2 without causing internal blocking.

FIG. 20 shows the details of the incoming I/F section 1 in the equipment shown in FIG. 19. The incoming I/F section 1 consist of a line I/F section 1a, a forwarding address table 1b, a transfer processing section 1c, and a datagram transmision section 1d. Here, in the incoming I/F section 1, upon receiving a datagram from an incoming link in the line I/F section 1a, the fransfer processing section 1c refers to the forwarding address table 1b to determine the destination outgoing I/F section 2, and forwards the received datagram to the corresponding datagram transmisstion section 1d so as to transmit the received datagram to the destination outgoing I/F section 2 through the back plane switch section 3.

FIG. 21 shows the details of the outgoing I/F section 2 in the equipment shown in FIG. 19. The outgoing I/F section 2 is consists of a datagram receiving section 2a, a buffer memory 2b, a buffer enqueue control section 2c, a buffer dequeue control section 2d, and a line I/F section 2e. Here, in the outgoing I/F section 2 upon receiving a datagram from the back plane switch section 3 in the datagram receiving section 2a, the buffer enqueue control section 2c enters the datagram in the buffer memory 2b according to processing method implemented in it, and the received datagram waits for an outgoing link to become available. In other words, as shown in the flowchart in FIG. 22, incoming I/F section 1 is selected according to a pre-determined sequence (usually in the ascending order of I/F numbers) (step S1), and is checked whether a datagram has been received from the selected incoming I/F section 1 (step S2). If there is a datagram, it is entered in the vacant spaces in the buffer memory 2b (step S3), and if there are incoming I/F sections 1 still to be processed (step S4), the steps subsequent to step S1 are repeated. Otherwise, this procedure is terminated. When there are n pieces of incoming I/F sections 1 to be processed, processing for the incoming I/F section 1 must be performed at n times the speed of the unit processing of the outgoing link (which is usually the reciprocal of a time interval required to transmit one datagram). In the meantime, when the line I/F section 2e becomes vacant, the buffer dequeue control section 2d transfers datagrams from the buffer memory 2b to the line I/F section 2e, in the sequence of datagrams entry. Then, the datagrams are transmitted from the line I/F section 2e to the outgoing link.

In the conventional datagram transmission node, processing method for the buffer enqueue control section 2c in the outgoing I/F section 2 is such that, so long as there are available memory spaces in the buffer memory 2b, datagrams are entered in the order of their arrival. The processing method based on a combination of the above method of entering datagrams with the sequential reading method in the buffer dequeue control section 2d, which reads datagram according to the sequence of their entry, is called first-in-first-out (FIFO) method, because a datagram arriving first is output first.

On the other hand, if datagrams arrive when there are no vacant memory spaces in the buffer memory 2b, normally they are all discarded. However, especially in the Internet, the utilization of a link can be increased by avoiding exhaustion of the available spaces in the buffer memory 2b and preventing the necessity for discarding many datagrams all at once. For this reason, the router in the Internet uses the random early detection (RED) method so that, even if there are vacant memory spaces in the buffer memory 2b, datagrams are discarded beforehand according to a certain probability, which is dependent on the utilization of the buffer memory 2b.

FIG. 23 shows a data entry procedure according to the RED method. In this method, incoming I/F sections 1 are selected according to a pre-determined sequence (step S1), and arrival of a datagram from the incoming I/F sections 1 is checked (step S2), and a rough value for the buffer utilization factor is estimated (step S5), and a probability value for entering the datagram in the buffer memory 2b is obtained according to the estimate (step S6), and a transfer potential is judged based of the probability (step S7), and when the datagram is not to be transferred, the datagram is discarded according to the judgement results even when there are vacant spaces available within the buffer memory 2b.

It can be realized that as far as the methods of entering datagrams in the buffer memory in the conventional datagram transmission node are concerned, in the FIFO method, datagrams are processed in the order of their arrival, and in the RED method even though, the packets are discarded according to the utilization of the buffer memory 2b, datagrams are basically entered in the buffer memory 2b in the order of their arrival, and when spare memory spaces are not available, datagrams are discarded. Furthermore, the decision to transfer or discard datagrams is made, not on the basis of information on the datagrams themselves but on the basis of information obtained at outgoing I/F section2, such as the utilization of the buffer memory 2b, according to some criterion, for example, when there is no vacancy in the buffer memory or when the vacancy falls below 10%.

However, in the datagram transfer system based on such conventional methods, the datagram transmission node performs transfer process according to the arrival sequence of datagrams by considering only the information obtained at the outgoing I/F section 2, such that it is possible for one user to acquire more network resources than other users if that one user sends more datagrams in a short time interval, even though a high number of datagrams will be discarded in such a situation. If a large volume of datagrams is sent out for the purpose of acquiring more network resources than other users, individual datagram transmission nodes can experience congestion, resulting in discarding a large volume of datagrams to be processed by the node. The result is that the number of datagrams that reach the ultimate destination without being discarded decreases dramatically so that the effective data transfer capability of the entire system suffers, in other words, the system experiences a congestion collapse.

SUMMARY OF THE INVENTION

It is an object of the present invention to provide a traffic monitoring equipment, a datagram transfer system and a datagram transfer method to enable to operate a datagram transfer network stably by avoiding a state of congestion collapse of the network, by utilizing information derived from evaluating the impact of datagrams on the operation of the network. To achieve this object, a buffer enqueue control section in the outgoing I/F section of the datagram transmission node derives information (in a form of a preference value) so that the datagrams are processed by an approach other than the methods based on arrival sequence of datagrams.

To achieve the object, the traffic monitoring equipment includes a traffic monitoring function for monitoring traffic information relating to datagrams that have been transmitted by a user to a network or datagrams that have been received from the network by the user during a specific time interval between a pre-determined earlier point in time and a current point in time, and storing monitored results; a preference value computation function for evaluating user's usage of the communication, based on traffic information obtained by the traffic monitoring function, quantifying results of evaluation and converting the results of quantification to a preference value; and a preference value insertion function for inserting the preference value in the header of a datagram being processed at the current point in time.

Also, the present datagram transfer system receives datagrams sent from a user terminal in a datagram transmission node and forwards the datagrams to a destination address specified on the header of the datagrams, wherein an impact of the datagrams on network operation is evaluated by a traffic monitoring equipment according to traffic information on the datagrams, evaluation results are quantified, and quantified results are converted and are inserted in the header as a preference value.

Further, the present method of datagram transfer is based on performing prioritized transfer of datagrams transmitted by users for being transferred through a network, and includes the steps of: evaluating an impact of transmitting a datagram on network operation; computing a preference value for the datagram to reflect evaluation result; inserting a computed result in the header of the datagram; and providing prioritized forwarding of datagrams according to preference values computed for successive datagrams.

According to these aspects of the present datagram transmission node, it is possible to realize datagram transfer network that can operate stably, by avoiding the state of congestion collapse caused by inflow of unnecessary volume of datagrams sent out by the users for the self-centered purpose securing more network resources.

Also, the present datagram transfer system is provided with a device for performing prioritized forwarding of the datagram according to the preference value specified in each header of the datagram.

The present datagram transfer system is provided with the datagram transmission node that includes a back plane switch section for transferring a datagram from an incoming interface section to an outgoing interface section without causing interval blocking, and a buffer enqueue control section for obtaining a preference value from a datagram received in the outgoing interface section, selecting priority datagrams to be transmitted successively in a buffer memory in an ascending order of preference values from a low preference value to a high preference values so as to avoid traffic congestion and enqueuing the priority datagrams.

The present datagram transfer system is provided with the traffic information that includes a length of a datagram or time intervals between transmissions of successive continual datagrams.

The present datagram transfer system is provided with the traffic monitoring equipment that uses a length field of the datagram provided in a header of a datagram for inserting a preference value.

The present datagram transfer system is provided with the traffic monitoring equipment that computes a preference value based on an inverse of a difference between transmission times of one previous datagram and a current datagram, as well as on lengths of each datagram that has been transmitted or received at corresponding times.

The present datagram transfer system is provided with the traffic monitoring equipment that computes an average rate, for use as a preference value, obtained by using a sliding window method of computation based on a length of a datagram and time intervals between transmissions of successive continual datagrams.

The present datagram transfer system is provided with the traffic monitoring equipment that computes an average rate during a monitoring period, for use as a preference value, obtained from a length of a datagram and time intervals between transmissions of successive transmissions of continual datagrams.

The present datagram transfer system is provided with the traffic monitoring equipment that computes a difference between a number of datagrams transmitted by a user and a number of datagrams received by the user, for use as a preference value.

The present datagram transfer system is provided with the buffer enqueue control section that includes a preference value extraction function to obtain a preference value; a preference value comparison function to perform sorting by using the preference value as a sort key; so as to prioritize datagrams in an ascending order of preference values and to enable a buffer enqueue control section to enter datagrams in a buffer memory according to the ascending order of preference values.

The present datagram transfer system is provided with the outgoing interface section that includes a class-divided buffer memory section having a plurality of priority orders, and the buffer enqueue control section perform prioritized forwarding by entering datagrams in the class-divided buffer memory section according to preference values.

The present datagram transfer system is provided with the preference values that are acquired at fixed periodic interval periodic or at intervals that can be varied according to rates of arrival of datagrams.

The present datagram transfer system is provided with the buffer enqueue control section that judges whether to transmit a datagram prior to entering the datagram in a buffer memory, and if it is judged not to transmit a datagram, the datagram is discarded even if there are vacant memory spaces available, and if it is judged to transmit a datagram, the datagram is entered in the buffer memory.

The present datagram transfer system is provided with the buffer enqueue control section that computes sums of preference values of processed datagrams that have been entered in a buffer memories, computes probability values based on results of summing computation and discards datagrams according to resulting probability values.

The present datagram transfer is provided with the buffer enqueue control section that prioritizes datagrams in an ascending order of preference values, obtains probability values derived from buffer memory utilization according to the ascending order, and discards datagrams according to the probability values.

The present datagram transfer system is provided with the datagram transmission node that includes a back plane switch section for transferring a datagram from an incoming interface section to an outgoing interface section without causing internal blocking; wherein the outgoing interface section prepares a threshold value at a selected timing so that a preference value is obtained from a header of a received datagram so that, based on the threshold value and the preference value, a judgment is made whether or not to transmit the received datagram prior to entering the received datagram in a buffer memory so that if the received datagram is not to be transmitted, the received datagram is discarded even if there are vacant memory spaces available, and if the received datagram is to be transmitted, the received datagram is entered in the buffer memory by a buffer enqueue control section.

In the present datagram transfer, the judgment conducted prior to entering a datagram in a buffer memory is performed by comparing a threshold value with a preference value of a received datagram so that the received datagram is discarded when the preference value is higher than the threshold value.

In the present datagram transfer system, the judgment, conducted prior to entering a datagram in a buffer memory, is performed by comparing a threshold value with a preference value of a received datagram so that a probability can be computed using a function with input parameters based on a difference between the threshold value and the preference value to determine whether to transmit or not to transmit the received datagram.

The present datagram transfer system is provided with the buffer enqueue control section that includes a preference value storage function for storing time data related to events of either arrival of datagrams within a pre-determined time interval, transfer or discard of datagrams as well as preference values so as to enable to compute a threshold value based on the preference values.

In the present datagram transfer system, the judgment, conducted prior to entering a datagram in a buffer memory, is performed by computing a probability using a function with input parameters based on a threshold value, a preference value of a received datagram, and a buffer utilization factor or an estimate of buffer utilization so that the received datagram is discarded based on the probability.

In the present datagram transfer system, the judgment, conducted prior to entering a received datagram in a buffer memory, is performed in such a way that all datagrams with preference values higher than a product of a buffer utilization factor or an estimate of buffer utilization and a threshold value, are discarded regardlessly and, failing such a criterion, all datagrams with preference values higher than the threshold value are processed so as to discard those datagrams having high preference values preferentially at a higher probability, and, when the buffer utilization factor or an estimate of buffer utilization is high, to discard those datagrams having high preference values preferentially at a more higher probability.

In the present datagram transfer system, the threshold value, to be used to judge transmission of a datagram, is computed by randomly sampling preference values of arrived datagrams at a selected probability; storing a given number of preference values; and designating a center value of sampled preference values as a threshold value at a selected timing.

In the present datagram transfer system, the threshold value, to be used to judge transmission of a datagram, is computed by randomly sampling preference values of arrived datagrams at a selected probability; storing a given number of preference values; and designating an average value of sampled preference values as a threshold value at a selected timing.

In the present datagram transfer system, the threshold value, to be used to judge transmission of a datagram, is computed by randomly sampling preference values of datagrams selected for transmission at a selected probability; storing a given number of preference values; and designating an average value of sampled preference values as a threshold value at a selected timing.

DESCRIPTION OF THE PREFERRED EMBODIMENTS

Preferred embodiments will be presented in the following with reference to the drawings. The method of prioritized datagram transfer method based on the preference values in the datagram transfer system of the present invention is executed by combining the following two approaches.

1. The network evaluates the degree of impact (network load) a datagram would produce on the network at the time of transferring the datagram, and computes a preference value that reflects the degree of impact of the datagram so that the preference value can be attached to the header of the datagram. Here, if the impact is low, a low value is assigned to the preference value.

2. In the datagram transmission node in the network, datagram transmission is prioritized according to the preference values, not according to their arrival sequence to the node. Specifically, datagram transfer is controlled such that those datagrams having low preference values are preferentially transmitted at a higher probability compared to those having high preference values.

Figure 1:
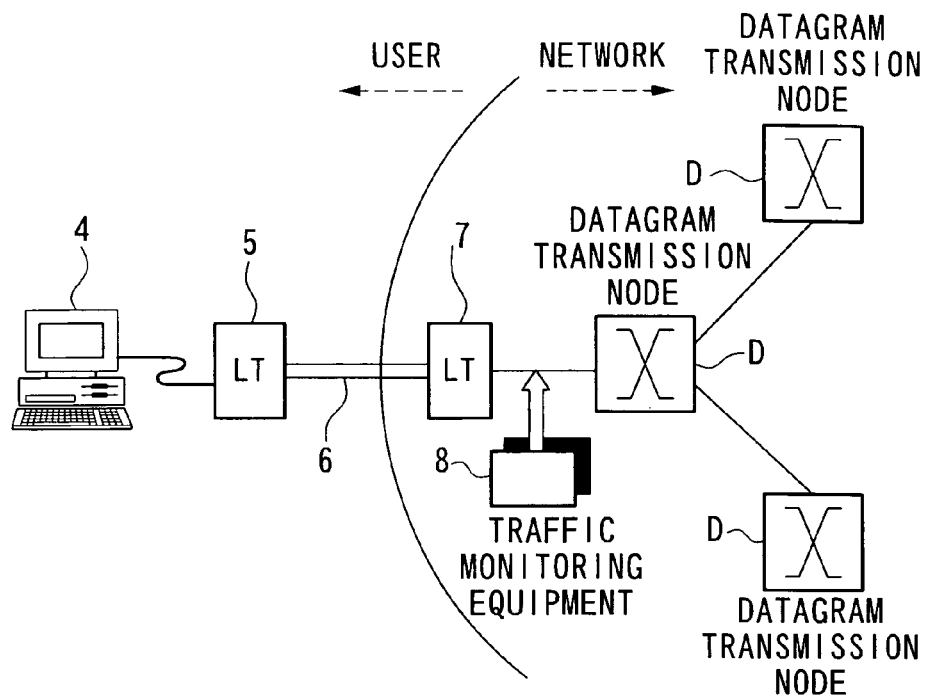
FIG. 1 is a block diagram of an embodiment of the datagram transfer system of the present invention.
Figure 20:
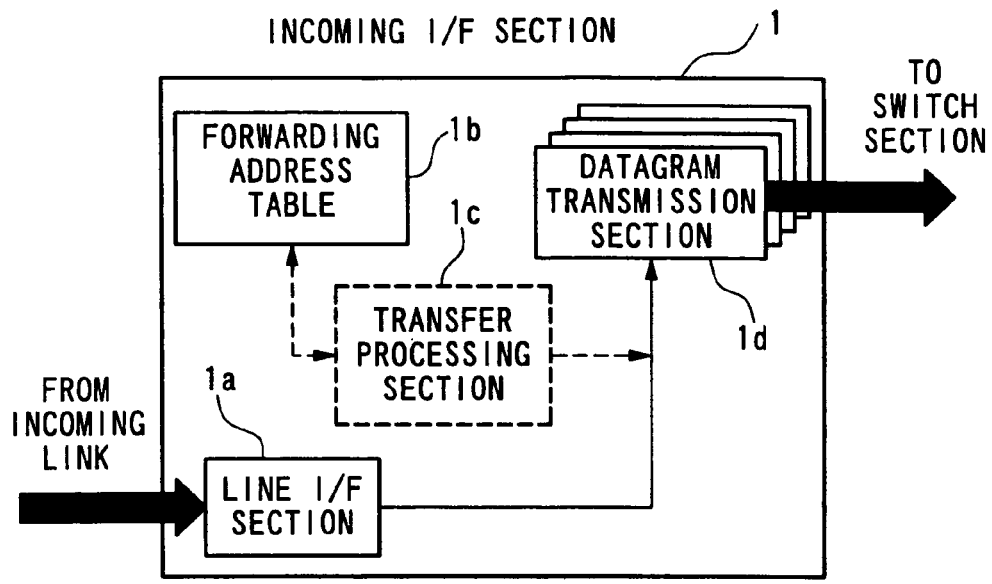
FIG. 20 is a block diagram of an example of the conventional incoming interface section in FIG. 19.

FIG. 1 shows a block diagram of the datagram transfer system to execute the datagram transfer method described above including a general network and a user terminal, and shows the specific location of the traffic monitoring equipment, which is an element to enable the present invention to be realized. Datagrams sent through the system that includes a user terminal 4, a line terminating device 5, and access network 6 are forwarded by the transmission nodes D to the receiving terminal indicated by the address label according to the destination address table 1b in the incoming I/F section 1 such as the one shown in FIG. 20. A traffic monitoring equipment 8 is connected between the line termination device 7 to terminate the access network 6 and the first datagram transmission node D in the network so as to monitor the volume of traffic.

Figure 2:
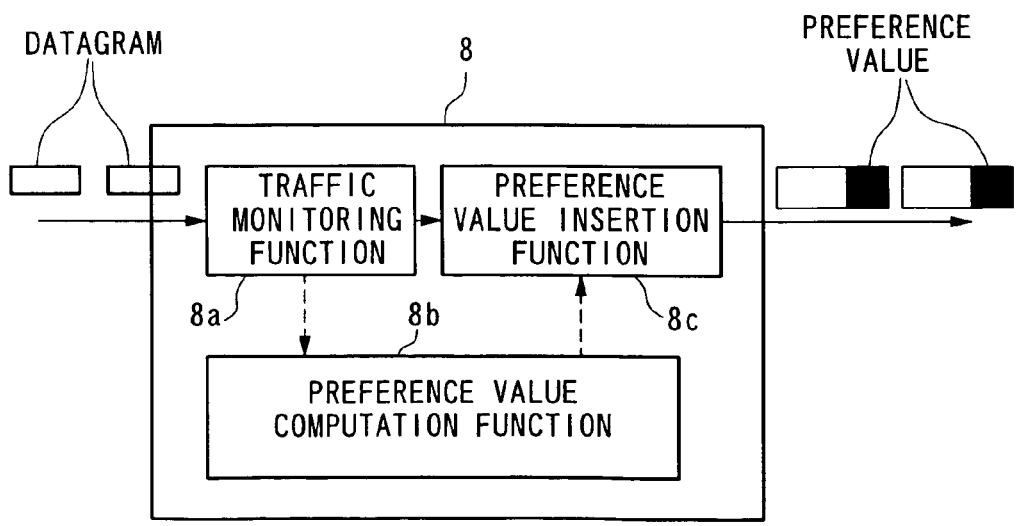
FIG. 2 is a block diagram showing the details of the traffic monitoring equipment.
Figure 3:
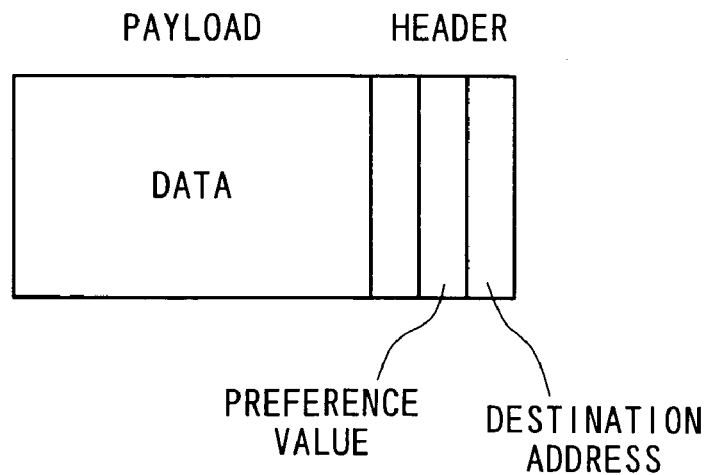
FIG. 3 is an illustration of the header field of the datagram of the present invention.

FIG. 2 shows a structure of the traffic monitoring equipment 8, which includes a traffic monitoring function 8a, a preference value computation function 8b and preference value insertion function 8c. The traffic monitoring function 8a monitors traffic information related to datagram transmission and reception, for example, length of the datagram and time interval of successive transmissions of continual datagrams, occurring within the network within a predetermined time interval, and retains the monitored results therein. The preference value computation function 8b performs computation of a preference value according to the retained information in the traffic monitoring function 8a according to a predetermined function. The preference value insertion function 8c inserts the value computed by the preference value computation function 8b in the header of the datagram. That is, the traffic monitoring equipment 8 evaluates the impact (load on the network) of the datagram on the network operation, obtained by the preference value computation function 8b using the data acquired by the traffic monitoring function 8a; quantifies the results of monitoring; and inserts the results in the header of the datagram. The preference value inserted by the preference value insertion function 8c of the traffic monitoring equipment 8 is retained, as shown in FIG. 3, in the field reserved in the header for inserting the preference value of the datagram to be forwarded. The value in the preference field of the datagram remains unchanged all through the period of propagating within the network so that the evaluation results performed by the traffic monitoring equipment 8 can be given to each datagram transmission node D within the network.

Figure 4:
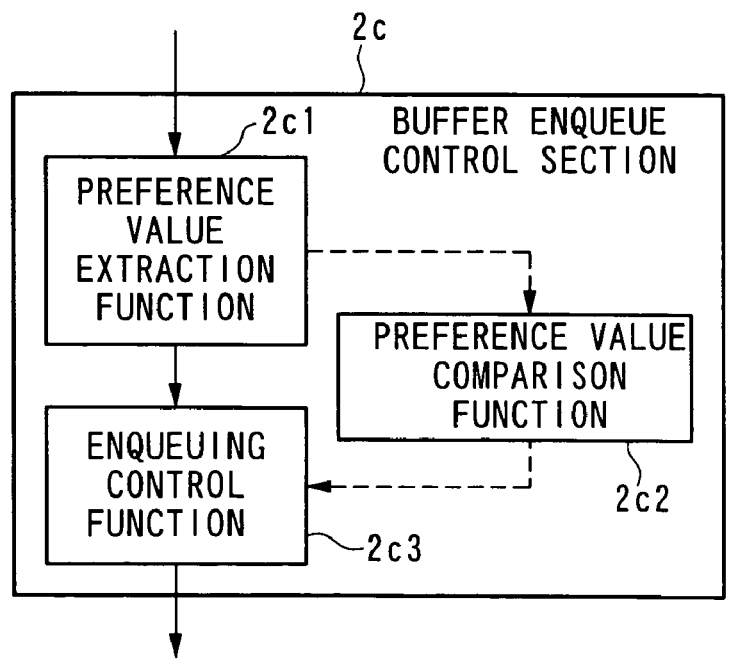
FIG. 4 is a block diagram of the buffer enqueue control section in the outgoing interface section.
Figure 21:
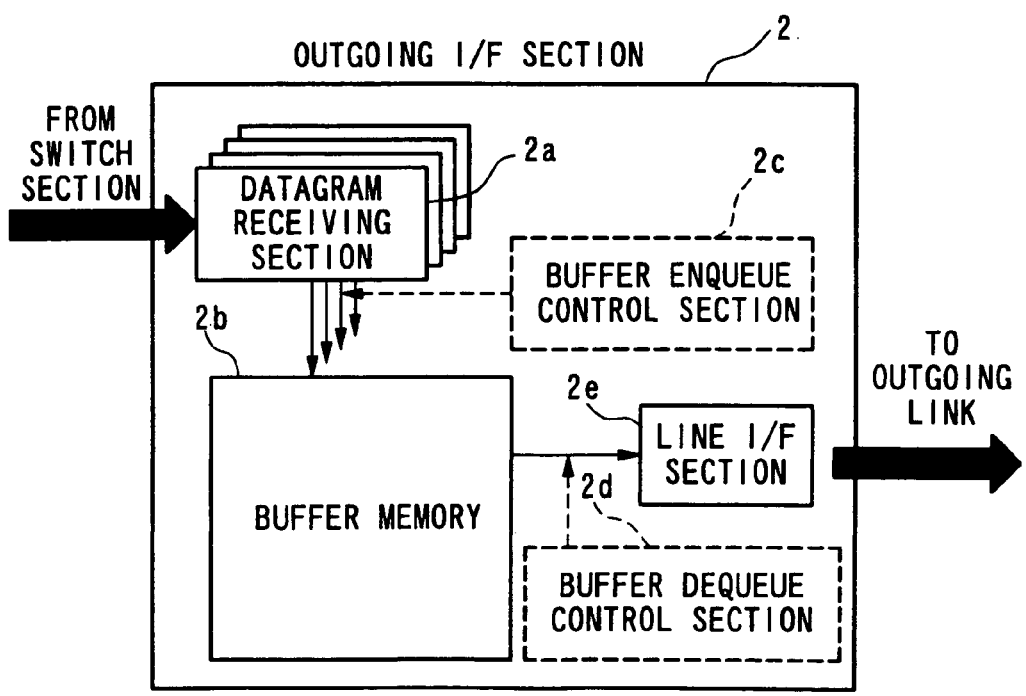
FIG. 21 is a block diagram of an example of the conventional outgoing interface section shown in FIG. 19.
Figure 22:
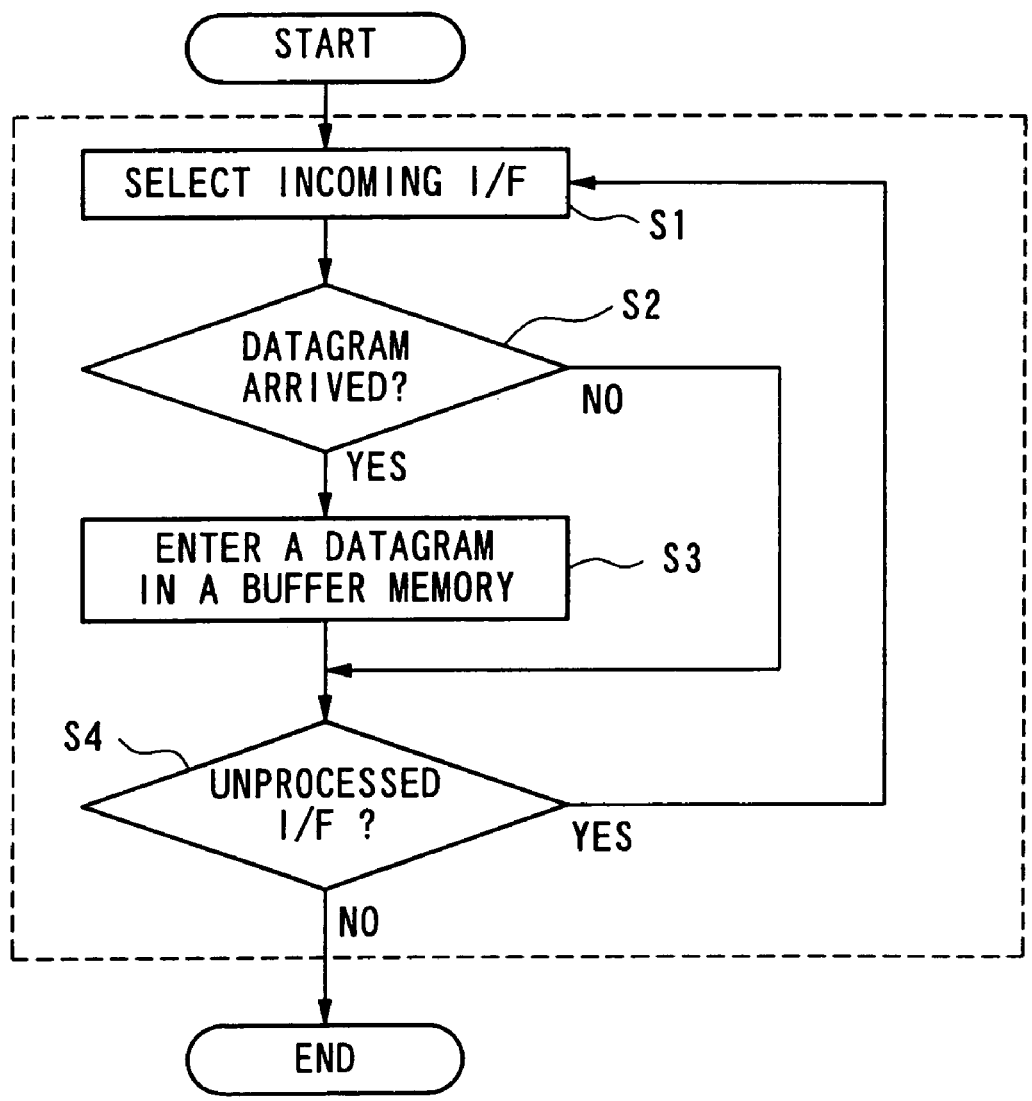
FIG. 22 is a flowchart showing the steps of datagram transfer method according to the conventional first-in first-out approach.
Figure 23:
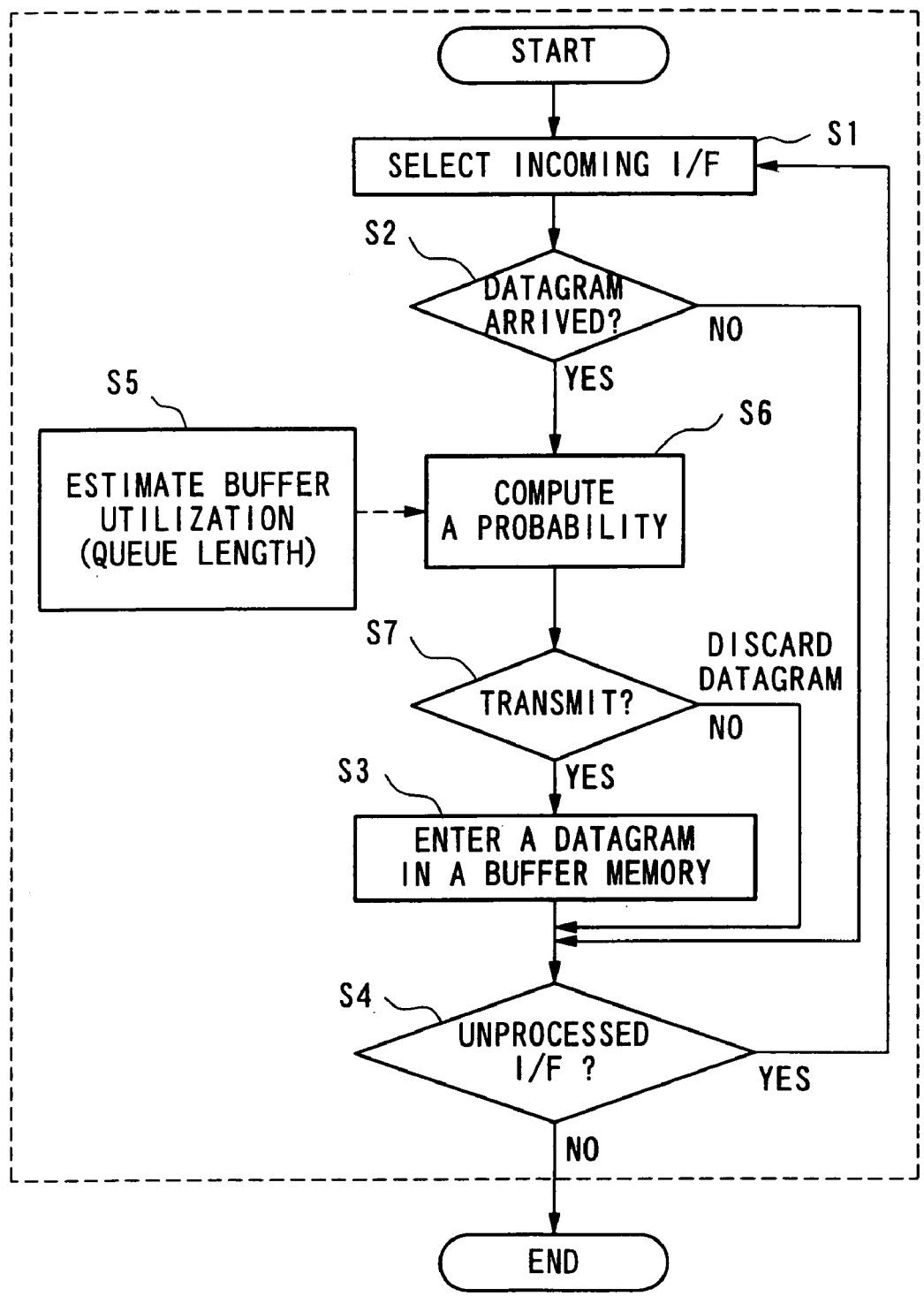
FIG. 23 is a flowchart showing the steps of datagram transfer method according to the random early detection approach.

FIG. 4 shows the structure of the buffer enqueue control section 2c including a preference value extraction function 2c1, a preference value comparison function 2c2 and an enqueue control function 2c3. The preference value extraction function 2c1 extracts and retains a preference value from the header of the received datagram. The preference value comparison function 2c2 compares all the preference values retained and processes them in such a way that, those received datagrams having low preference values will be preferentially selected for transmission. The enqueue control function 2c3 uses the results of preference value comparison function 2c2 such that datagrams with the low preference values are selected for transmission so as to avoid creating network congestion. The datagrams selected are entered in the buffer memory 2b as shown in FIG. 21, and the datagrams that are not selected for transmission are discarded.

Figure 5:
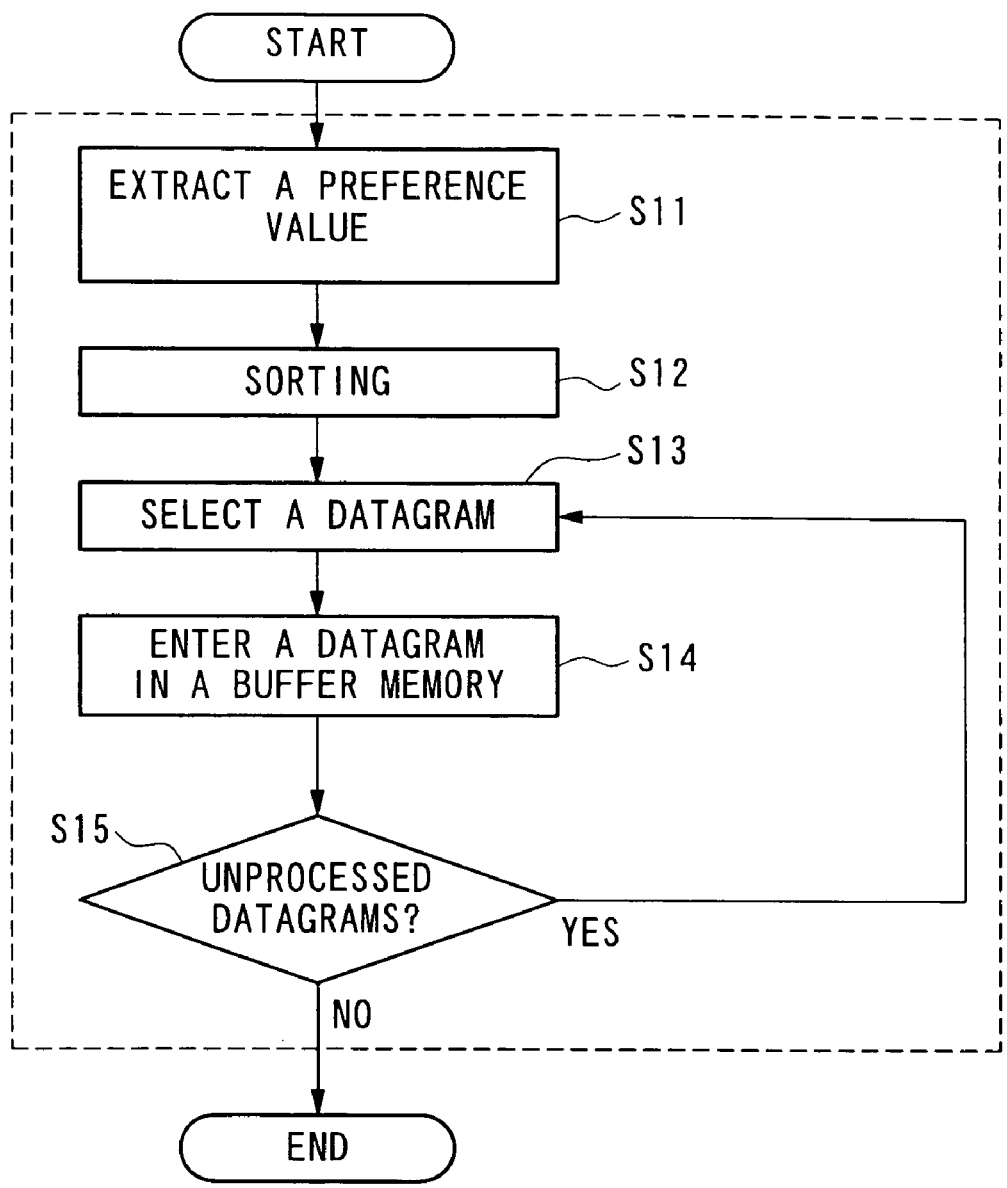
FIG. 5 is a flowchart showing the steps of entering the datagram in the buffer memory according to the enqueue control function.

FIG. 5 shows a flowchart for buffer enqueuing according to the control function 2c3. This method is different from the conventional fist-in first-out method. First, a list of preference values of the received datagrams is obtained by the preference value extraction function 2c1 (step S11). Next, the values are sorted by the preference value comparison function 2c2 (step S12) and the datagrams are sorted in the ascending order of preference values (step S13). The enqueue control function 2c3 enters the datagrams in the buffer memory 2b (step S14). If there are unprocessed datagrams (step S15), steps subsequent to step S13 are executed, on the other hand, if all the datagrams have been processed, the procedure is terminated.

In the present method, the datagrams are not processed in the sequence of their arrival by the datagram transmission node, but are processed based on their preference values indicated in the header such that those datagrams having low preference values are transmitted preferentially. The preference values are assigned after monitoring the data traffic patterns of users in the network so that if, for example, a user tries to send a large volume of data in a short time, those datagrams will be assigned higher preference values by the traffic monitoring equipment, resulting in those datagrams being discarded by the datagram transmission nodes at a higher probability than other datagrams having lower preference values. It follows that sending a large volume of data in a short time at the expense of discarding a large volume of datagrams, does not enable a user to secure more network resources. The result is suppression of unnecessary datagrams transmitted for the purpose of acquiring network resources, thus lowering the danger of creating a state of congestion collapse in the datagram transfer network.

The method of prioritized datagram transmission according to preference values is based on evaluation of user traffic pattern by the network and a prioritized transfer method based on priority order derived from quantified results of the evaluation, and is executed by two functional elements including the preference value computation function 8b in the traffic monitoring equipment 8, and by adopting a specific method in entering the datagram in the buffer enqueue control section 2c in the datagram transmission node D. Examples of the two elements will be described in the following.

In the buffer enqueue control section 2c, the preference value extraction function 2c1 prepares a list of preference values of arriving datagrams, and preference values are compared and sorted according to preference values so as to provide ascending order of preference values for priority transmission, and the datagrams are then entered into the buffer memory 2b according to the priority order. The process of determining the preference values is carried out periodically at a suitable interval T. If a long interval T is chosen, the number of arriving datagrams to be sorted increases so that a large volume of datagrams can be surveyed to emphasize the effect of the selection technique. At the same time, however, the delay time between arrival of datagrams and their transmission to the outgoing link is increased. Therefore, an optimal time interval T is selected by considering such effects. A fixed time interval may be used but it is also possible to adjust the time interval depending on the rates of arrival of datagrams.

Figure 6:
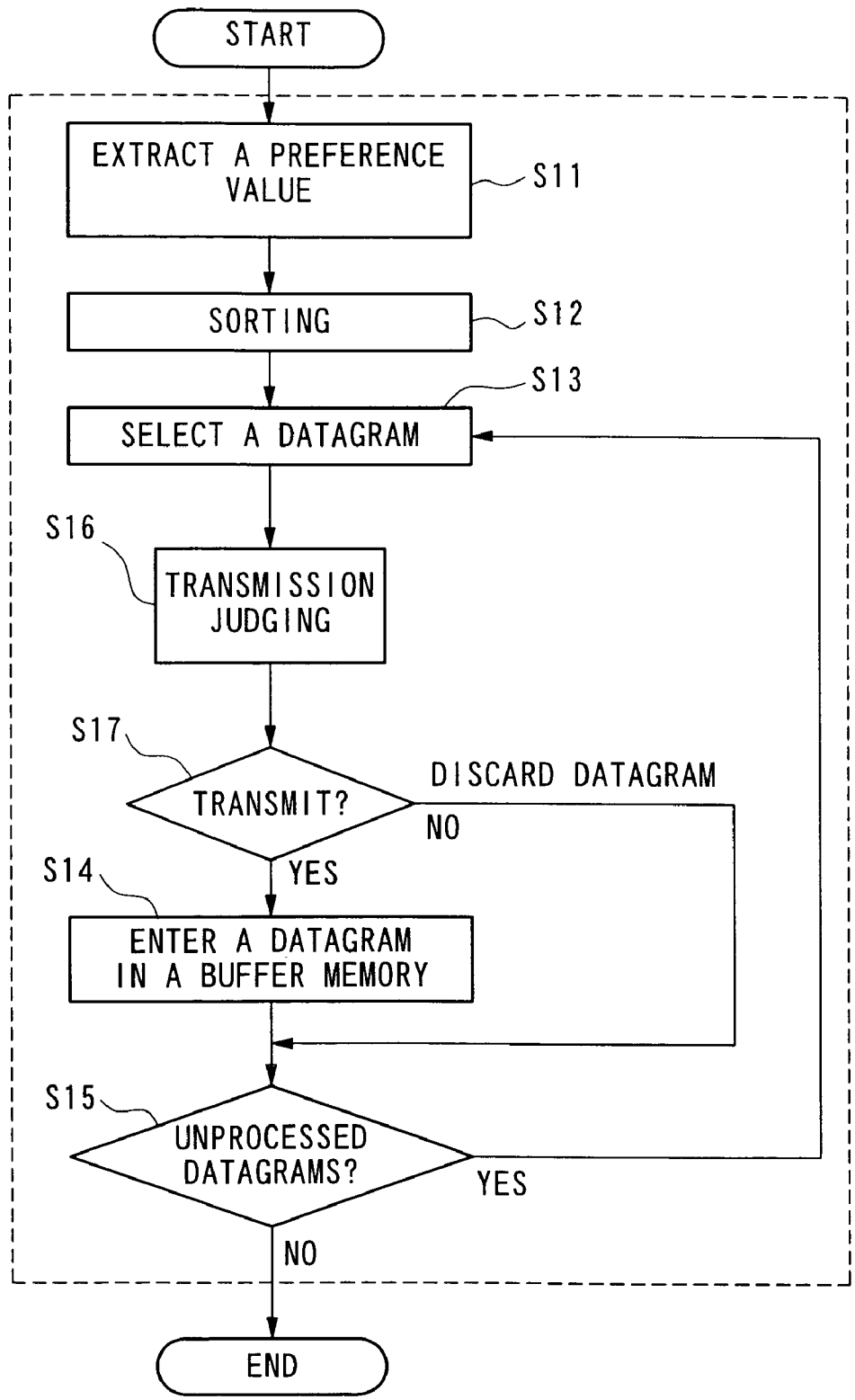
FIG. 6 is a flowchart showing the steps of entering the datagram in the buffer memory according to another enqueue control function.
Figure 7:
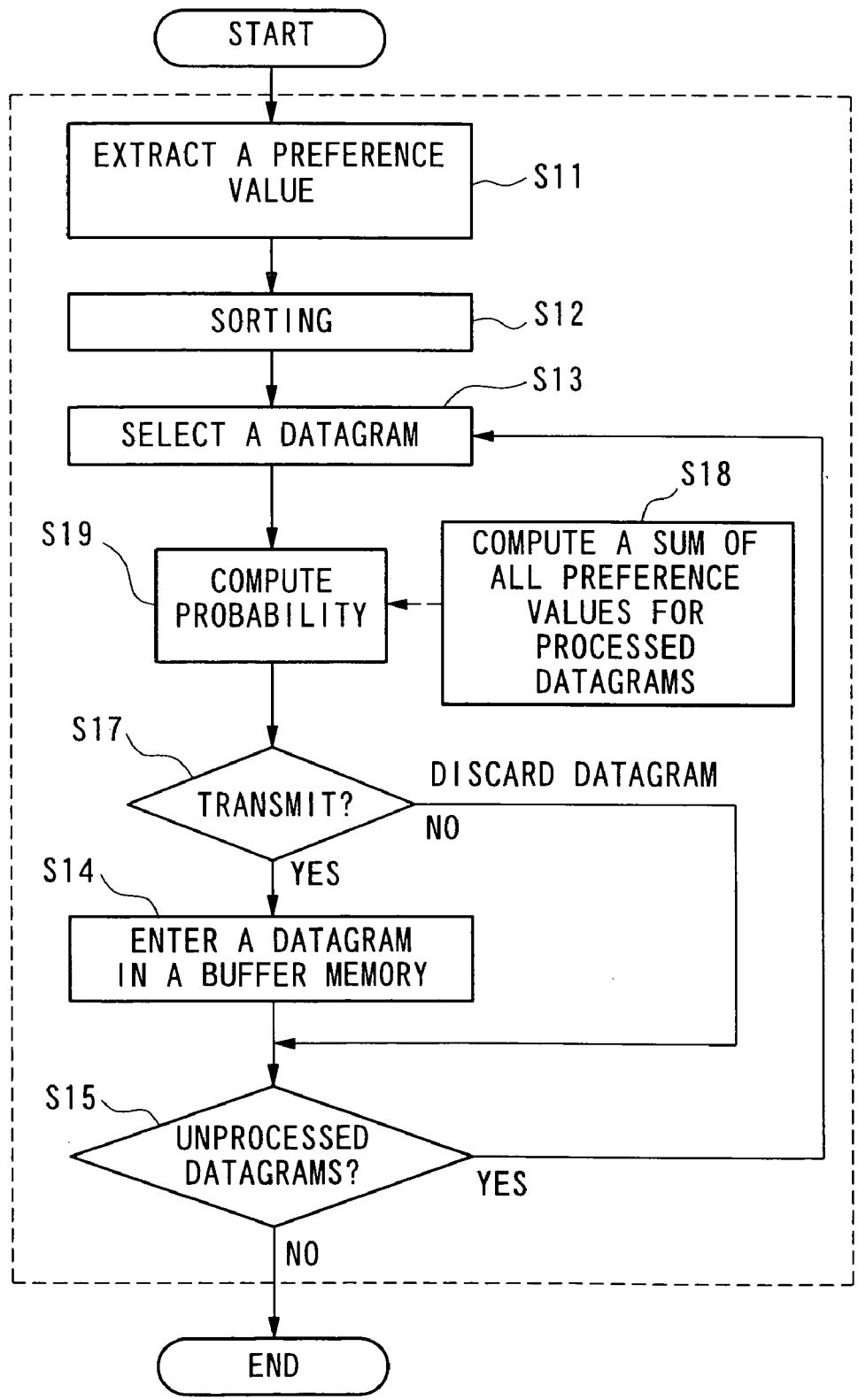
FIG. 7 is a flowchart showing the steps of entering the datagram in the buffer memory according to a yet another enqueue control function.
Figure 8:
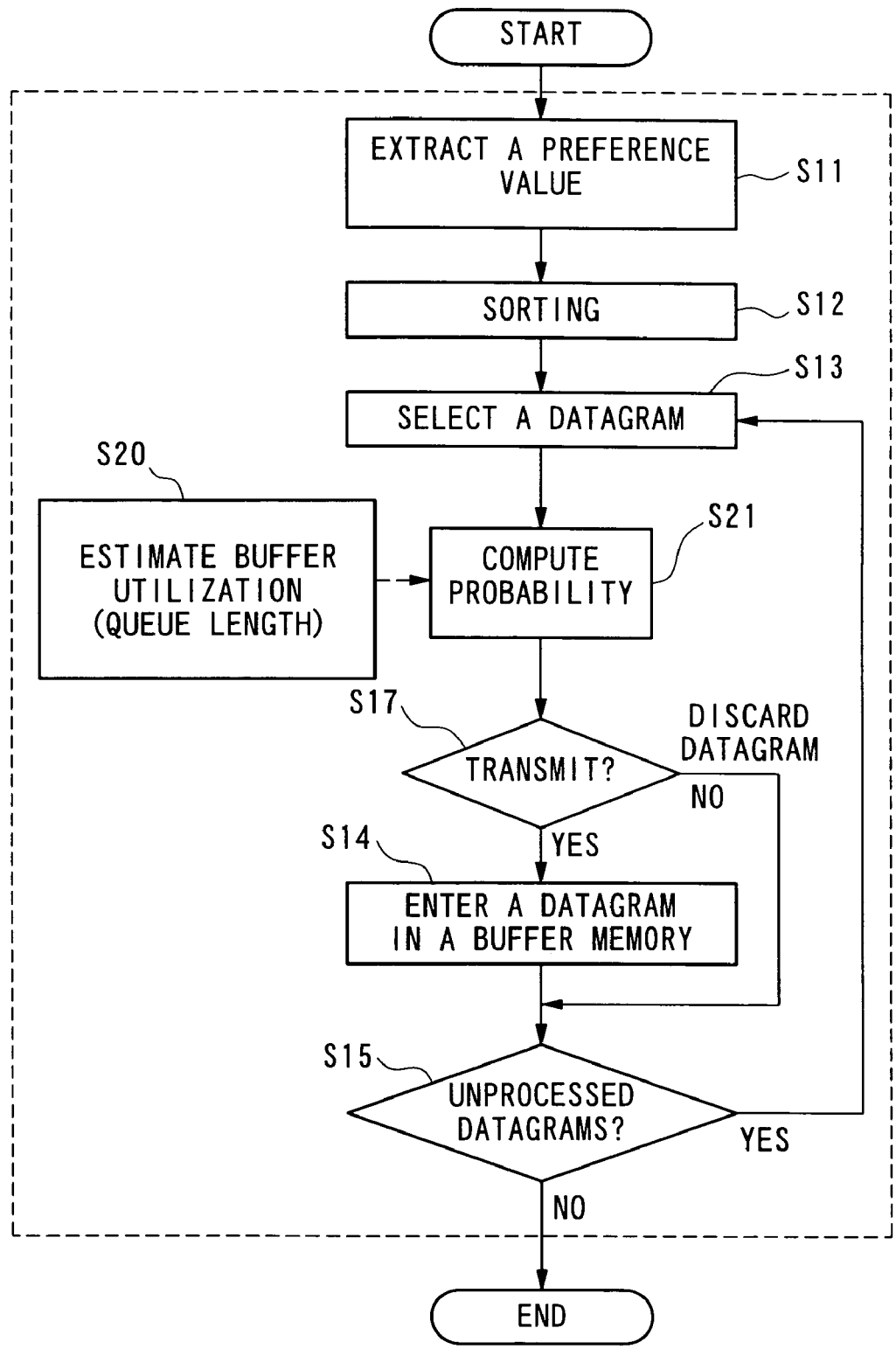
FIG. 8 is a flowchart showing the steps of entering the datagram in the buffer memory according to a still another enqueue control function.

Also, as shown in FIG. 6, steps additional to those shown in FIG. 5 may be taken before enqueuing the datagram to the buffer memory 2b such that transfer judging can be performed (step S16) to decide whether to transmit or not to transmit the datagram. In this procedure, if the datagram is not to be transmitted (step S17), it may be discarded even if vacant memory spaces are available in the buffer memory 2b. A specific example is shown in FIG. 7. A sum of the preference values of the datagrams that are already entered in the buffer memory is computed (step S18), so that discarding may be performed based on a probability (of filling the memory space) computed from the summed value (step S19). It means that those datagrams that are processed later, that is, those datagrarms having higher preference values would experience higher discarding probability, and that the effect of the invention is greater compared with the procedure shown in FIG. 5. It is also possible to use the enqueuing procedure in conjunction with the RED method used for routers in the Internet. FIG. 8 shows a flowchart of the enqueuing procedure incorporating the RED method. According to this method, a list of preference values are obtained first (step S11), datagrams are sorted (step S12) and selected (step S13) so that the datagrams are transmitted by the RED method according to the sequence derived. In more detail, the usage of the buffer memory 2b is estimated (step S20), a discard probability based on the estimation is obtained (step S21), transfer judgment is performed (step S17) so that enqueuing to buffer memory 2b or discarding of datagrams can be performed according to the result of judgment.

Figure 9:
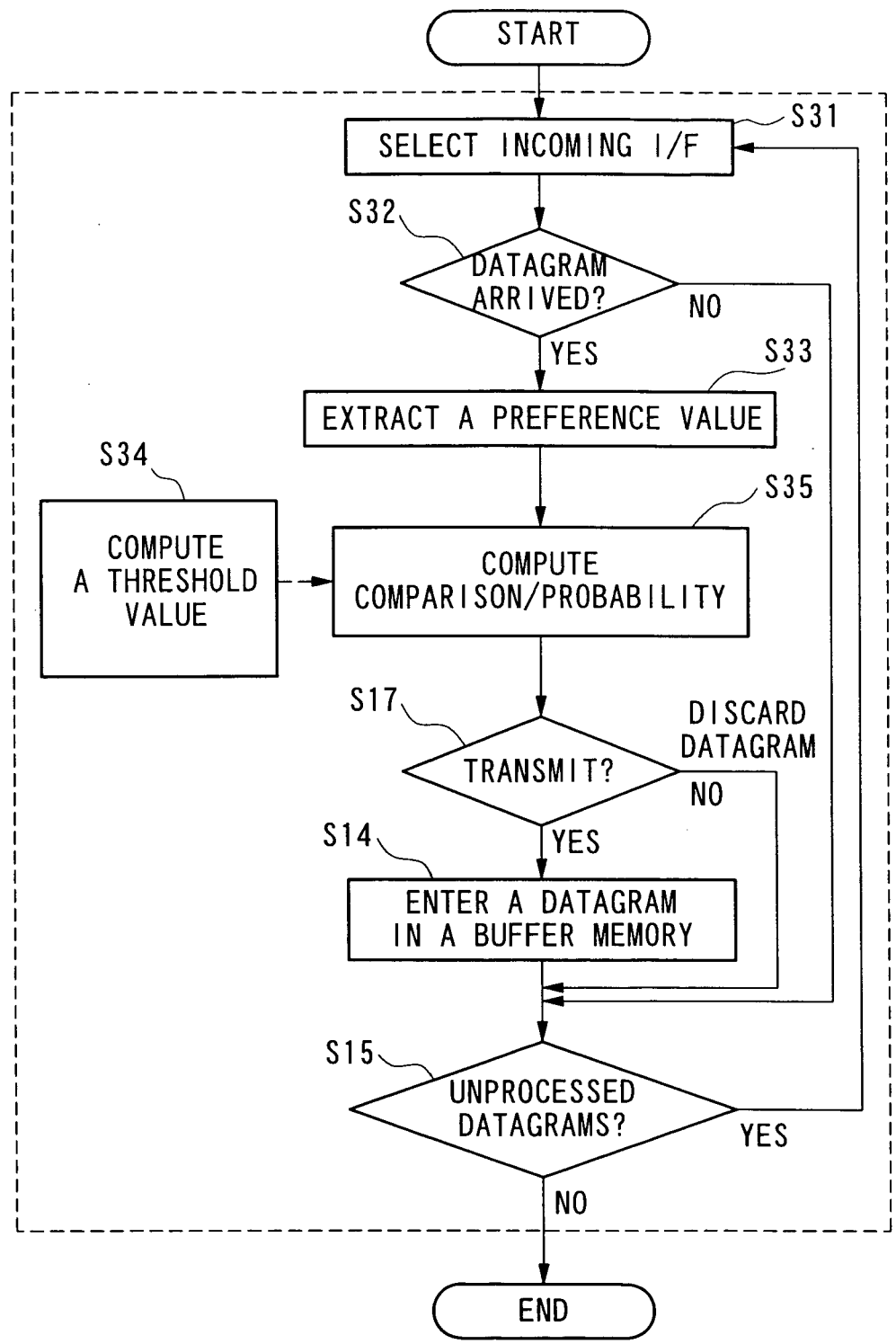
FIG. 9 is a flowchart showing the steps of entering the datagram in the buffer memory according to still another enqueue control function.
Figure 10:
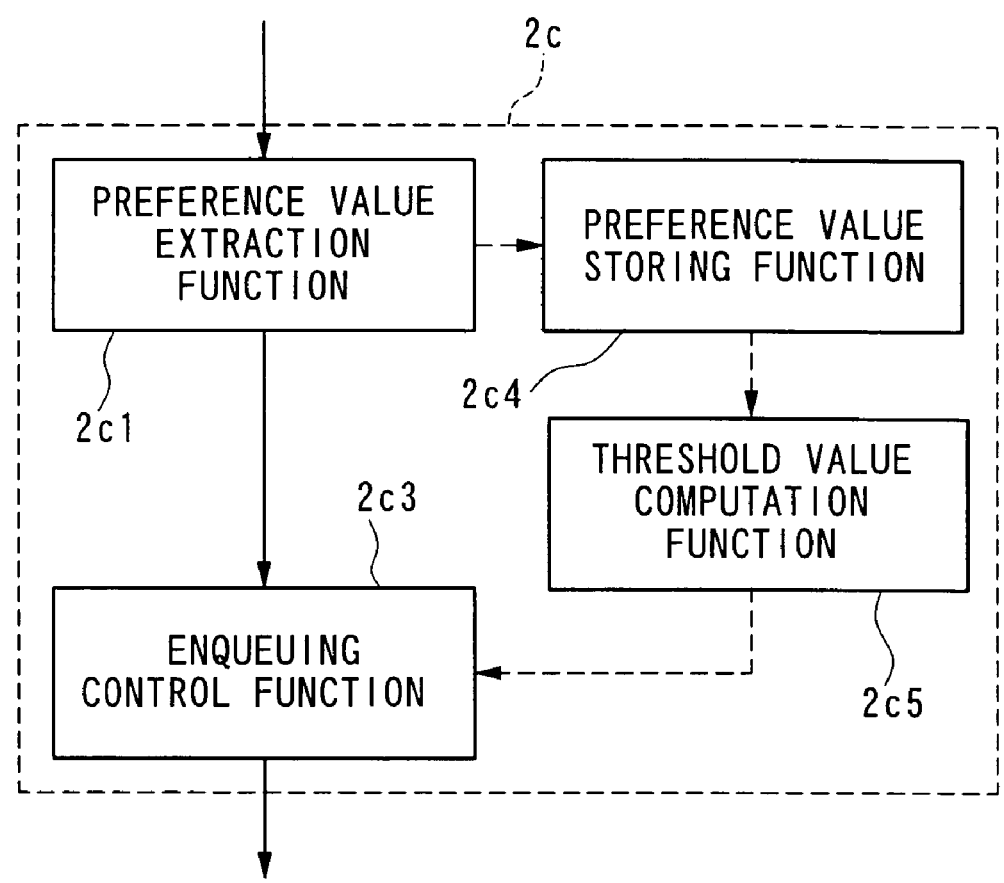
FIG. 10 is a block diagram of another example of the buffer enqueue control section in the outgoing interface section.

In the cases shown in FIGS. 6~8, it is necessary to select a suitable interval T for acquiring of preference values. In contrast, in the case shown in FIG. 9, the datagrams are not processed all at once as in the previous cases, but they are processed one at a time in sequence as they arrive so that sorting is not carried out after obtaining their preference values. In other words, incoming I/F sections 1 are selected according to a pre-determined order (step S31), presence or absence of datagrams is checked (step S32), the preference values are acquired by the preference extraction function 2c1, such as the one shown in FIG. 10 (step S33), and is stored in the preference value storage function 2c4. Next, the threshold computation function 2c5 computes threshold values at suitable intervals (step S34), and compares preference values of arriving datagrams with the threshold values (step S35), and if the preference value is higher than the threshold value, the datagram is discarded, and if it is not higher, the datagram is transmitted so as to perform selective buffer enqueuing (step S14). In this example, because there is no need for altering the selection sequence, a feature of this method is that the conventional method can be upgraded relatively easily to the present method. It is also possible to adopt a method for comparing the preference value and the threshold value such that the difference between the two values are input into a probability computation function (step S35), so that the computed probability is used as a criterion for discarding a datagram. (step S17).

The present method can be used in conjunction with the RED method. This method is a selective datagram discarding method based on comparing preference values with threshold values computed at some suitable intervals, determining the buffer usage, and obtaining usage-dependent dependent probability values so as to enable to discard datagrams according to a probabilistic approach. It is also possible to increase the probability of discarding datagrams having higher preference values by adopting the procedure described in the following. According to such a method, it is possible to selectively discard datagrams that are deemed to be sent more than fair volume of datagram and are deemed to be sent by a user for the purpose securing more network resources. In such a case, the discarding probability can be expressed as in the following expression 1.

$$B = \begin{cases} 1 & p \geq (m+1)V \\ ((p-V)/mV)^k & (m+1)V > p \geq V, k > 1 \\ 0 & V > p \end{cases} \quad (1)$$

where m=Qtarget/Qcurrent, where Qtarget is a fixed parameter and Qcurrent is the current buffer usage, V is a threshold value, p is a preference value for an arriving datagram. This function has the following characteristics: when $V \leq p < (m+1)$, when p increases, discarding probability increases, and when k is assigned to a high value, discarding probability increases dramatically in the vicinity of (m+1)V. Because the datagrams having values close to (m+1)V are discarded with high probability, normal flow of datagrams, that follow the transmission control protocol (TCP) so as not to send more than the fair volume of data, are sent at fair rate by restricting the upper rate at this value. Therefore, the sending rate of TCP-based flow rate stabilizes about the threshold value V and remains below the value of (m+1)V.

In spite of this, datagrams having preference values higher than (m+1)V are considered to be a non-TCP flow, and are judged to be sending more than the fair volume of data. Datagrams having such values are totally discarded, thereby shutting out the flow of non-TCP datagram aimed at securing more network resources.

In this case, the values of m are varied according to changes in the buffer usage. Quantitative explanation of computation of m is given below. If the overall incoming rate from all the datagram flows is less than the link rate, buffer usage is 0 and m becomes infinity so that incoming datagrams are not discarded. On the other hand, when the lines are congested, buffer usage is increased, and m is decreased accordingly, and therefore, datagrams are discarded preferentially starting from those having higher preference values. Accordingly, incoming rate can be reduced starting from the data flows having the higher incoming rates.

The selective datagram discarding method described above is expressed by the following algorithm. Here, rand (0, 1) represents a uniform random number of [0, 1].

```
On receiving packet,
if(V!=0&&Qcurrent!=0) {
  m=Qtarget/Qcurrent;
  if((m+1)*V≦p) {
    dropPkt( ); // discard
    return;
  } else if(V≦p) {
    if(pow((p-V)/(m*V),k)>rand(0, 1)) {
      dropPkt( );//discard
      return
    }
  }
}
```

Figure 11:
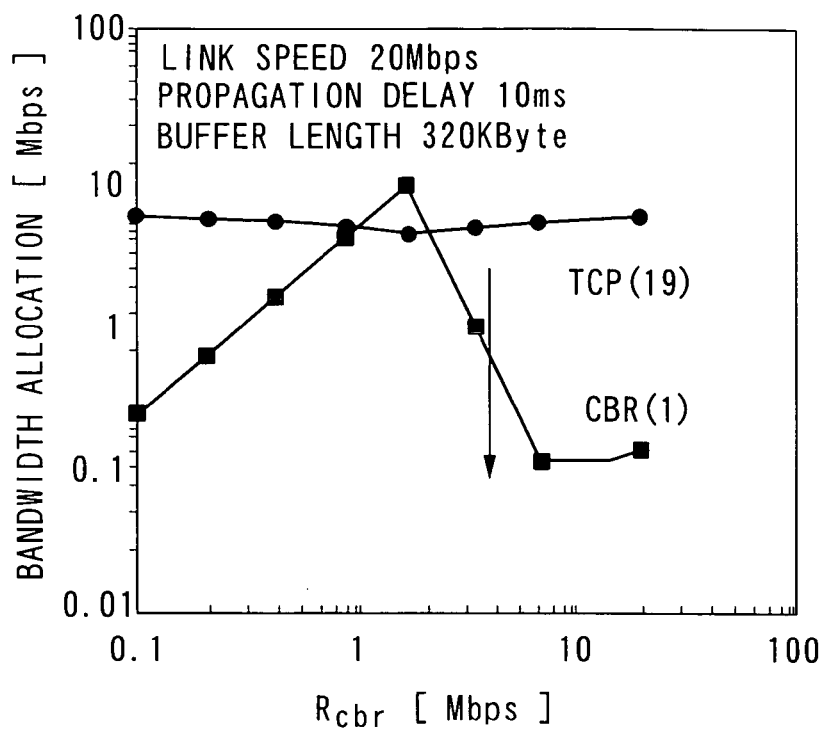
FIG. 11 is a diagram showing the shutting properties of excess incoming CBR-based flow.

The following is a simulation of bandwidth allocation so as to exclude unresponsive flow, which does not reduce incoming rate under congestion. Evaluation is carried out by using nineteen lines of TCP-based transmission mixed with 1 fine of constant bit rate (CBR) transmission through one link. Denoting the incoming CBR-based transmission with Rcbr. Allocated bandwidths of each flow during 100 seconds for various CBR input rates is shown in FIG. 11, in which incoming flow rate is shown on the horizontal axis and the allocated bandwidth at each flow rate is shown on the vertical axis. Because twenty flow lines are being multiplexed, it may be considered that 1 Mbps is a fair bandwidth allocation value. Therefore, when the CBR packets are arriving at less than 1 Mbps, the datagrams (packets) are not discarded. When the CBR packets arrive at a rate higher than 1 Mbps, the shutting mechanism described above operates to begin selectively discard the arriving CBR packets.

The packets of CBR flow are begin to be discarded at about 2 Mbps incoming rate so that it can be seen that the discard threshold value is higher than the fair bandwidth allocation value of 1 Mbps. This is because the incoming flow rates are scattered over a wide range, resulting in a large value for m in equation (1), so that the point of discarding packet begins at about 2 Mbps. This is caused by the practice of allocating a wider bandwidth for a data traffic pattern having less bursting than that for the data traffic pattern having high bursting.

The buffer enqueue control section 2c in the datagram transmission node D is provided with a function to record and store events and times for datagram arrival within a given flow rate range, transmitting and discarding, along with the preference values for the datagrams. Threshold values associated with these events are calculated according to the following values.

1. Average/median/average+dispersion/average+standard deviation/moving average/most prevalent value of dispersion for the past n packets transmitted.
2. Average/median/average+dispersion/average+standard deviation/moving average/least prevalent value of dispersion for the past n packets arrived.
3. Average/median/average+dispersion/average+standard deviation/moving average/most prevalent value of dispersion for past n packets discarded.
4. Average/median/average+dispersion/average+standard deviation/moving average/most prevalent value of dispersion for past packets transmitted within the past t seconds.
5. Average/median/average+dispersion/average+standard deviation/moving average/most prevalent value of dispersion for past packets arrived within past t seconds.
6. Average/median/average+dispersion/average+standard deviation/moving average/most prevalent value of dispersion for past packets discarded within the past t seconds.
7. Average/median/average+dispersion/average+standard deviation/moving average/most prevalent value of dispersion for past n packets transmitted within the past t seconds.
8. Average/median/average+dispersion/average+standard deviation/moving average/most prevalent value of dispersion for past n packets transmitted within the past t seconds.
9. Average/median/average+dispersion/average+standard deviation/moving average/most prevalent value of dispersion for past n packets transmitted within the past t seconds.

Other method for computing a threshold value described below may be adopted, which are based on determining the preference values for arriving datagrams and computing the threshold value statistically from their distribution spectrum.

(1) Preference values are extracted by randomly selecting Na pieces of arriving packets with a selection probability Pa.

(2) Na pieces of extracted preference values are arranged in some order, and their median value is used as a new threshold value.

A threshold value depends on the distribution spectra of preference values of arriving datagrams, as well as on the fact that, when a new threshold value is applied, transfer pattern of datagrams is altered, which prompt the users to control sending rate of datagrams, thereby resulting in changing the distribution spectra of arriving datagrams. Therefore, any method of changing the threshold values must strive to shorten the time required to stabilize the changes in distribution spectra.

According to the method described above, the interval of changing the threshold value can be adjusted by choosing the number of datagrams Na to be extracted, thereby enabling to adjust the time span for deriving the optimum threshold value. A threshold renewal times can be approximated by an expression, (Na/Pa)xpktsize/linkrate, when the datagrams are arriving at a rate determined by the link rate. Here, "pktsize" represents datagram length in [bits] and "linkrate" relates to a multiplexing rate for a link in [bit/s].

Figure 12:
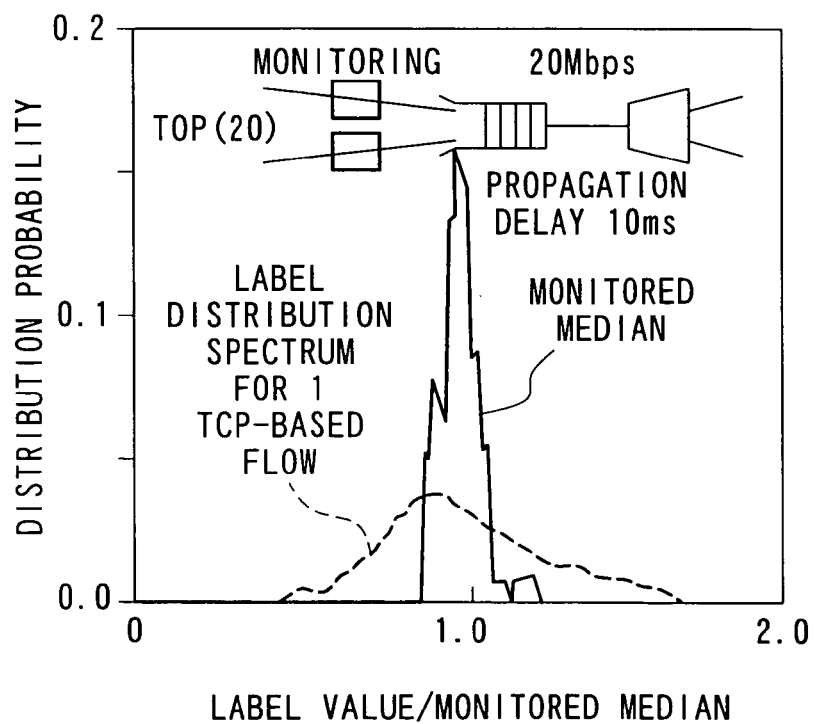
FIG. 12 is a diagram showing the properties of a label value distribution spectrum for TCP.

An example of evaluation of monitored distribution of TCP-based flow rates and monitored distribution of medians by label sampling will be described next. FIG. 12 shows a spectrum of label value distribution observed when twenty TCP lines are multiplexed for 100 seconds in a link using the FIFO queuing protocol, and a spectrum of median value distribution observed when Na=100 and Pa=0.1. The method of monitoring the TCP label with a time constant=400 ms, is according to a reference, Ion Stoica, Scott Shenker, Jui Zhang, "Core-stateless fair queuing: achieving approximately fair bandwidth allocations in high speed networks" SIGCOM98, 1999. The propagation delay in the link chosen is 60 ms.

Figures 13, 14:
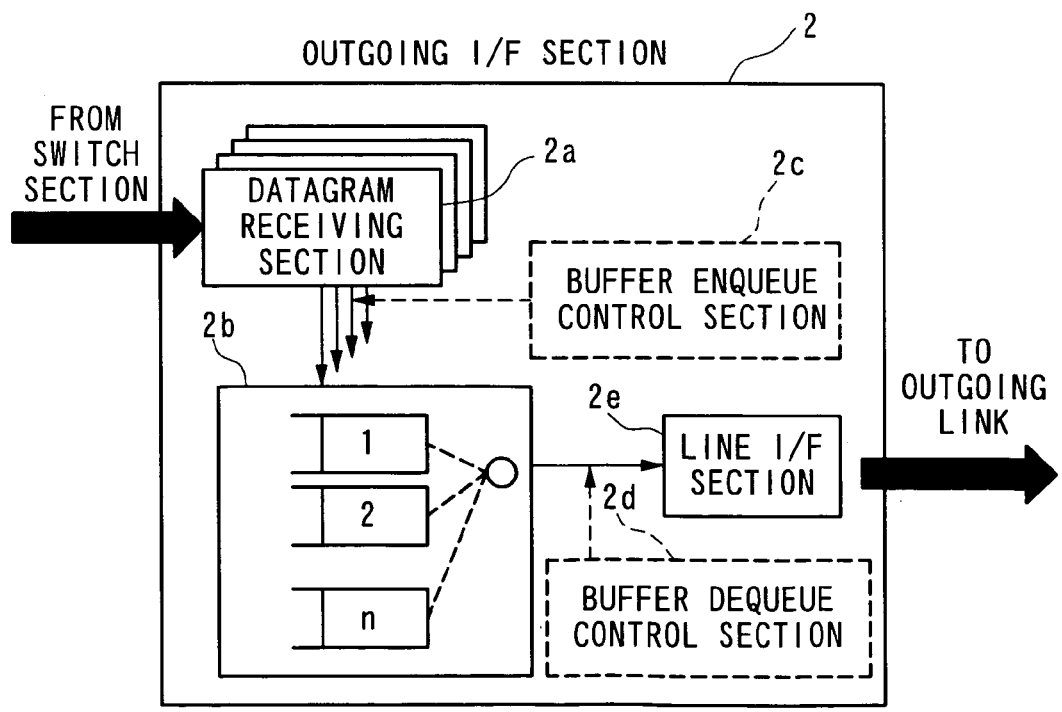
FIG. 13 is a table showing the distribution of median values of monitored traffic volume.
FIG. 14 is a block diagram of another example of the outgoing interface.

Also, FIG. 13 shows the results of evaluation of average of median values observed when the link propagation delay time is changed. Such median values can be used to estimate average incoming rate of data flow.

Next, FIG. 14 shows a buffer memory 2b having a number of class-divided memory sections in the incoming I/F section 2. These class-divided buffer memory sections have a respective priority order, and dequeuing is performed by the buffer dequeue section 2d according to such priority orders. The buffer enqueue control section 2c selects class-divided buffer memory sections, having own priority sequences, on the basis of the sequence given by the preference value comparison function, and enters the datagrams accordingly. Specifically, the buffer enqueue control section 2c performs the following procedure. Assume that there are n pieces of queues having own priority orders and 1~n values are allocated to each so that the smaller the number the higher the priority. Values that can be allocated to each preference is divided into n divisions so that the preference values are allocated in the ascending order of numbers between 1~n. Furthermore, a preference value separated by i divisions is allocated to the queue. This procedure performed by the buffer enqueue control section enables to allocate datagrams having low preference values to buffer memories having high priority orders, thereby realizing the effects of the invention even more effectively.

According to the present invention, it is possible to utilize the length field given in the header of ordinary datagram (for example IP) as a preference value. However, in the following example, a preference value computed from monitoring the data traffic is inserted in a special field in the header by the traffic monitoring equipment 8. In this example, there is no need to provide a special field in the datagram format. However, the length of the datagram is not given by the network, but is given at the user terminal so that the traffic monitoring equipment 8 performs a test to determine if the length value indicated on the datagram is the length of the actual datagram, and if the length is incorrectly indicated, the datagram is discarded.

Another method of computing the preference value is to use an inverse of the difference between the sending time of the one previous datagram and the current sending time (an inverse of a datagram sending interval). In this case, designating the current time by t, the length of the currently arriving datagram by M, the time of sending of one previous datagram by ti, length of the datagram by Mi, and $\alpha$ as a constant for adjusting the degree of impact on the network, then an expression $\alpha(M/Mi)\{1/(t-ti)\}$ may be used to compute a preference value. This value signifies an instantaneous user traffic speed so that it can be judged that the higher the value the higher its impact on the network.

Still another method of computing the preference value is to use the average rate (known as the sliding window method) computed from the length and time intervals of continually arriving datagrams. In this case, Mi represents the length of a datagram arrived more than i datagrams previously, ti the arriving time, n the number of datagrams that have been received, and $\alpha i$ the degree of impact on the network, where n, $\alpha i$ are predetermined values, then the average rate V is given by a ratio of the sum of each of $\alpha iMi$, (Ti−Ti+1) for i=0~n.

The value VK thus obtained is the average rate over a longer period compared with the case of inverse of the data transmission intervals of the datagrams, so that it is possible to evaluate the impact of the datagrams on the network.

Another method of computing the preference values is to use the average rate over the monitoring period computed from the length and time intervals of continually arriving datagrams. In this case, the monitoring interval is represented by TA, and the preference value is obtained by dividing the sum of the lengths of the datagrams arriving during the monitoring interval TA by the monitoring interval. It is also possible to use the summed value directly, and it is also possible to use a value obtained by dividing the sum of the datagram lengths with the maximum value of a sum determined by the physical link speed across the network, and the result is normalized to obtain a preference value.

Another method of computing the preference value is to use the difference between the number of datagrams output by the user and the number of datagrams arriving at the node. Normally, when the datagram transfer network is used correctly, datagram delivery is not guaranteed, therefore, ACK data packet is used by the receiver terminal to notify the sender terminal that a datagram has been received when a datagram is correctly received. Therefore, when the correct method is used to transmit datagram in a transmission network, the number of sending datagrams and the number of receiving datagrams should be approximately equal. On the other hand, if a user adopts a self-centered method that is a target of the present invention, a high number of datagrams will be discarded within the network so that ACK data packets are not send out, therefore, it can be considered that there may be a large gap between the number of datagrams sent by a user and the number of datagrams received in a transmission node. Therefore, by using the difference as a preference value, those datagrams based on the correct utilization of forwarding the datagrams are preferentially transmitted, thereby achieving the effect of the invention.

Also, for computing the threshold values, it is possible to adopt the method using an average of the preference values of the datagrams randomly sampled, rather than an median value of them, as the threshold values. That is, arriving datagrams are sampled randomly with a selection probability Pa, and the preference values of sampled datagarams obtained are extracted and stored. When the stored reference values reach Na pieces, the average value of them is computed to be used as the threshold value.

When the method of threshold computation using the median value of Na pieces of sampled and stored preference values is adopted, threshold values that are extremely high or low may be obtained depending on the distribution spectra of sampled datagrams. For example, when there are datagrams with extremely high flow rates, such datagrams sampled more frequently thereby skewing the threshold value towards extremely high values. On the other hand, the method using the average value is adopted, all the sampled datagrams are treated equally so that it is possible to avoid the situation that threshold value is set to extremely high or low value because of a skewed distribution spectrum. Accordingly, the users aiming to secure more network resources by sending more than the necessary volume of data will be discouraged much more effectively and generally.

Here, let us consider a case of the user datagram protocol (UDP) flow with unresponsive constant bit rate (CBR) of transmission to simulate a case of a user trying to secure more network resources by sending more than the necessary volume of datagrams. For example, consider a case of one UDP flow with CBR of 15 Mbps through a 20 Mbps link, followed by nineteen flows based on TCP. In this case, with the method the median value as the threshold value is adopted, the modian values of samples would be the preference value sampled from the unresponsive UDP flow so that the threshold value would be 15 Mbps. In this case, there would be no decrease in the flow rate of the unresponsive UDP flow, thus leading to no increase in the TCP flow.

On the other hand, when the method using the average value as the threshold value is adopted, if only a small volume of TCP flow arives the node, their preference values are sampled and the threshold value computed would also be lowered so that the datagrams of unresponsive flow with high sending rate would be more likely to be discarded. Also, when datagrams of TCP flows are not discarded but transmitted, sending and arriving rates of TCP flows would be increased gradually, and as datagrams would be sampled more frequently, leading more datagrams of low-rate TCP flows to be sampled, thereby lowering the threshold value even more. By repeating such a process, the threshold value is lowered more effectively, and it is possible to control transmission rate of datagrams of unresponsive flow more effectively compared with the case of adopting the method that use of throughputs of flows and a threshold value in the case described above median values.

Figure 15:
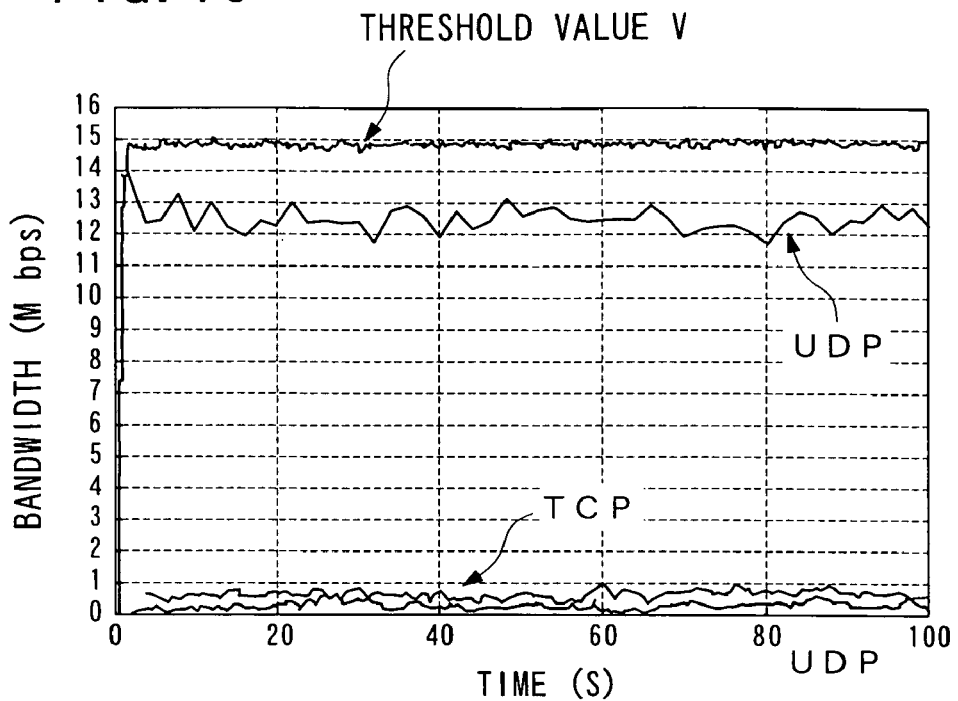
FIG. 15 is a graph showing an example of evaluation resulting from using the median value as the threshold.
Figure 16:
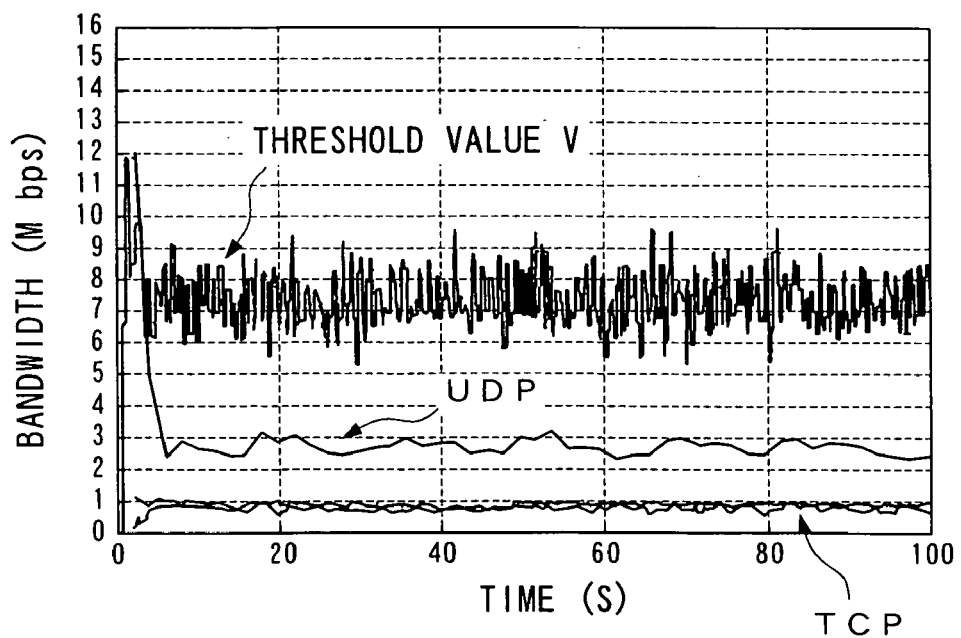
FIG. 16 is a graph showing an example of evaluation resulting from using the average value as the threshold.

FIG. 15 shows evaluation results when median value is used as the threshold values, and FIG. 16 shows evaluation results of them protocols when the average value is used as from the average values. As indicated in FIG. 15, when the median value is used as the threshold value, the threshold value is maintained at the high value and the transmission of unresponsive UDP flow remains unaffected. On the other hand, when the average value is used as the threshold value, the threshold value decreases compared with the case shown in FIG. 15, and the result is a decrease in the transmission rate of unresponsive UDP flow while increasing the transmission rate of TCP flow. From the results presented in FIGS. 15 and 16, it is possible to confirm the beneficial effect of the method using the average value as the threshold value. In performing such tests, the function for generating the discarding probability was based on equation (1), and parameters were as follows: buffer length 64 Kbytes, Qtarget=32 Kbytes, k=2, propagation delay in the multiplexing link 40 ms, Na=100, and Pa=0.1. Also, in FIGS. 15, 16, the throughput of one UDP flow and only two of the nineteen TCP flows are shown for ease of understanding, but the throughput of the remaining TCP flows are about the same as the one of two shown in each figure.

Figure 17:
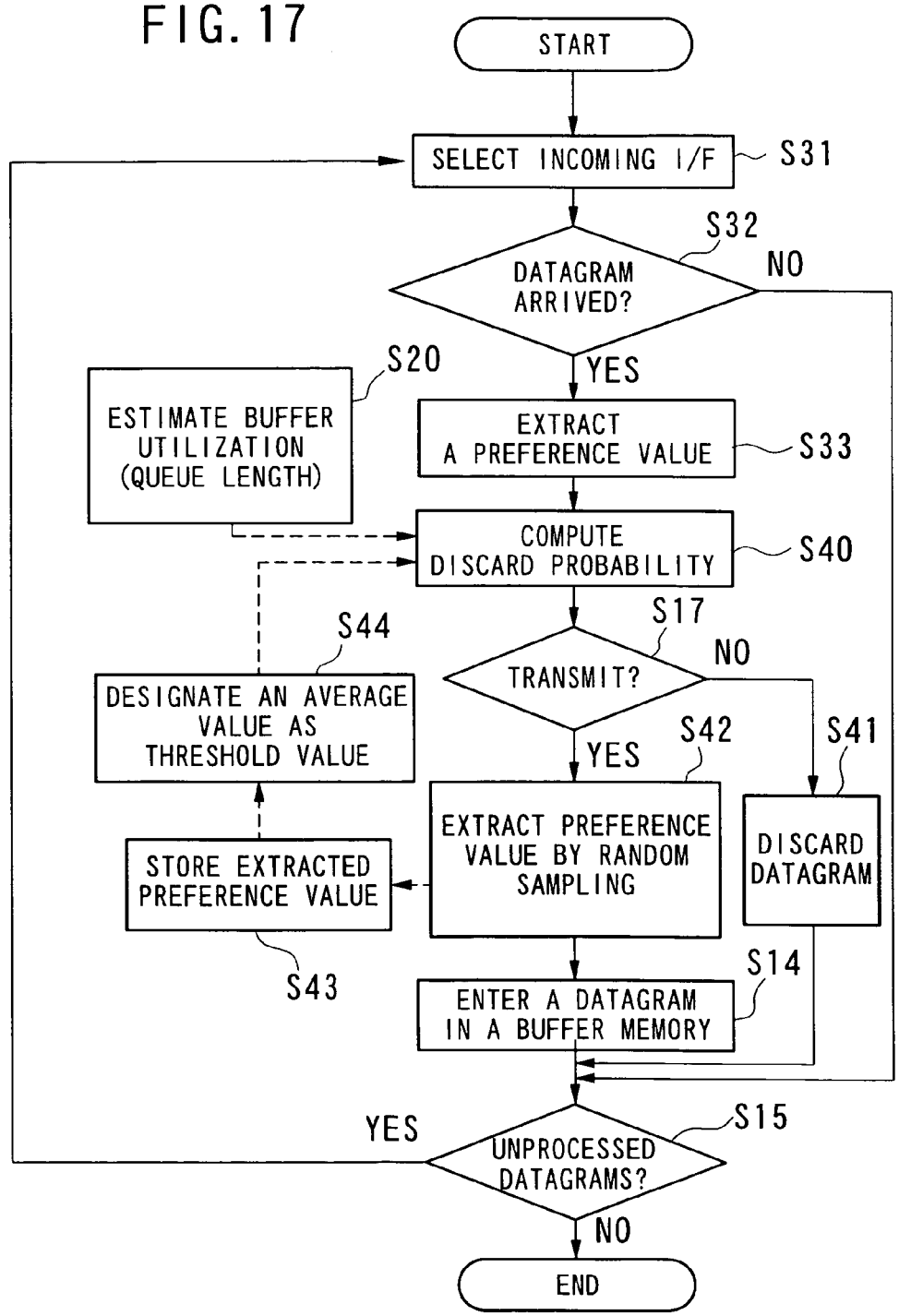
FIG. 17 is a flowchart showing the steps of another method of entering datagrams to the buffer memory according to the enqueue control function.

Also, as shown in FIG. 17, it is possible to sample outgoing datagrams instead of incoming datagrams. In this case, incoming I/F section 1 in the outgoing I/F section 2 is selected (step S31), presence or absence of datagrams is checked (step S32), and if there are datagrams, discard probability is computed according to a function with input parameters of threshold value computed at suitable intervals to be described later, as well as according to preference values of the arrived datagrams and buffer usage or an estimate of usage (step S40), so that datagrams are discarded based on the results (step S41). Only for those datagrams that are not discarded, random sampling is performed with a selection probability Pa to extract their preference values (step S42), and the extracted preference values are stored (step S43). When the number of stored preference values reaches Na pieces, an average value of them is computed and used as a threshold value (step S44).

Figure 18:
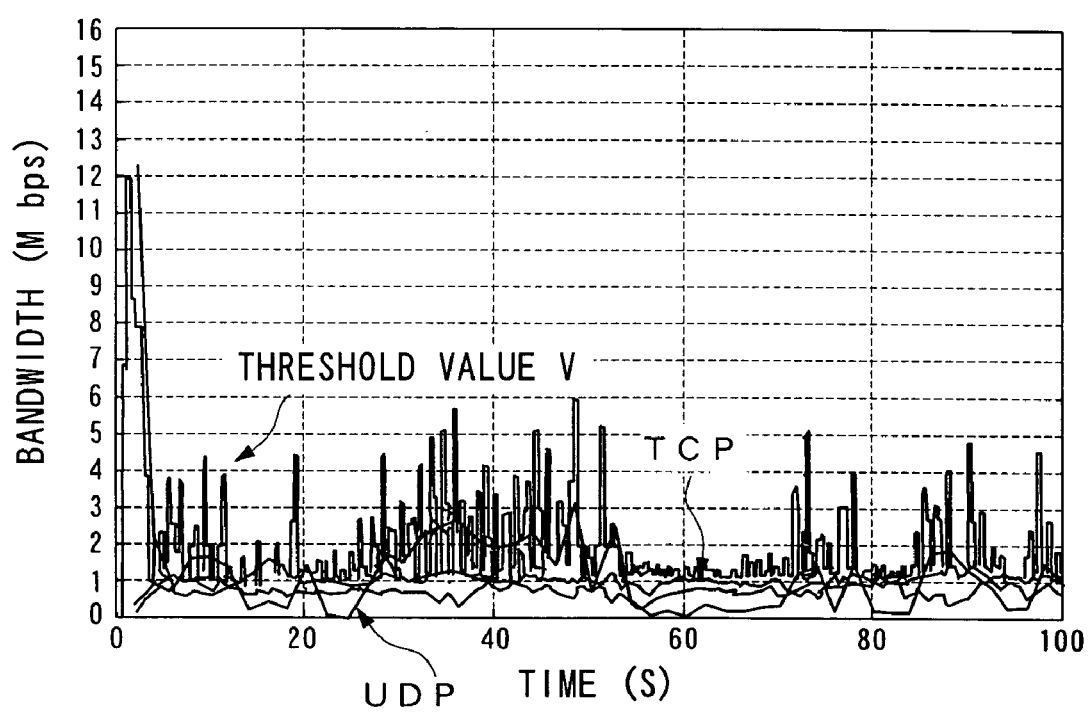
FIG. 18 is a graph showing an example of evaluation results obtained by the process shown in FIG. 17.
Figure 19:
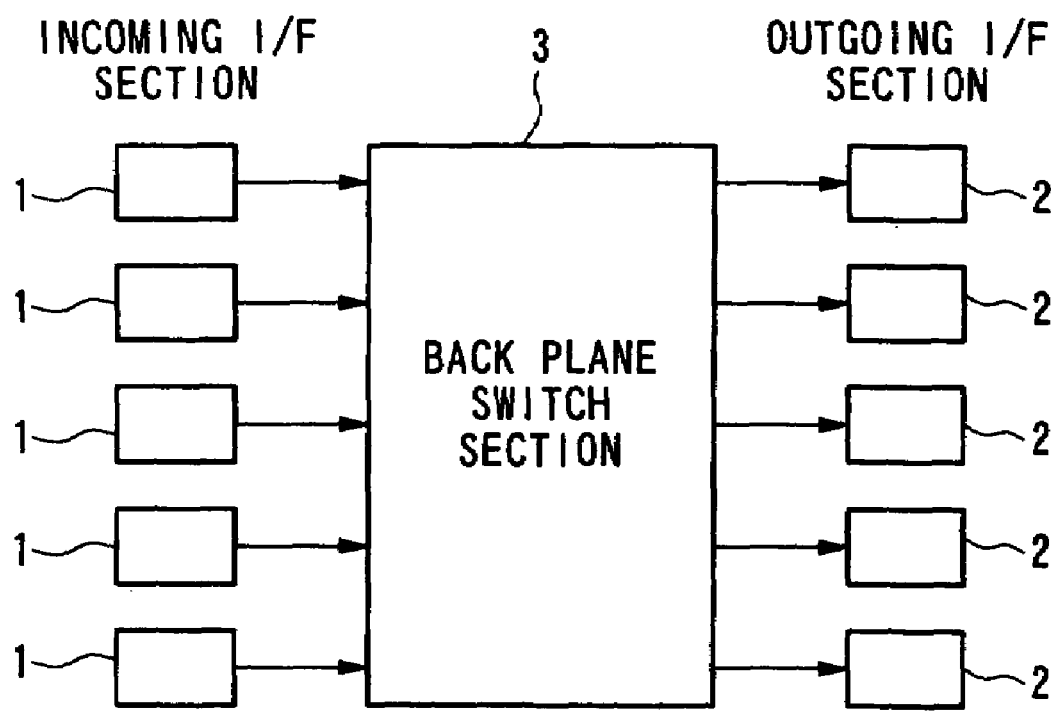
FIG. 19 is a block diagram of the basic structure of the datagram transmission node in the conventional method and in the present method.

Using this method, discarded datagrams are not subjected to sampling so that the proportion of the datagrams of unresponsive flow with high sending rate to the overall sampled datagrams is decreased. Therefore, the effect on lowering of the threshold value is increased even more so that the transmission rate of unresponsive flows can be suppressed more effectively. The results of evaluation in the same case as in FIGS. 15,16 are shown in FIG. 18. As shown in FIG. 18, unresponsive UDP flow and TCP-based flow are at about the same rate, thereby confirming the effectiveness of the method randomly sampling the outgoing datagrams and using the average value as the threshold value. Also in FIG. 18, the throughput of one UDP flow and only two of nineteen TCP flows are shown for ease of understanding as in FIGS. 15, 16, but the throughput of remaining TCP flows are about the same as those of two shown in FIG. 18.

Also, it is possible to adopt an equation (2) for discarding probability according to a function with input parameters of the threshold value, preference value, and buffer usage or an estimate of buffer usage so that datagrams having preference values higher than a product of buffer usage factor and threshold value are all discarded. Or, the function may be executed in such a way that any datagram having preference values higher than a threshold value may be discarded in the order of descending preference values, and the higher buffer usage or its estimated usage is, the more preferentially discarded the datagrams with high preference are. Such an equation (2) is expressed as:

$$m = Qthresh/Qcurrent$$

such that when $$\text{i) if } m > 1, \quad B(p, V, m) = \begin{cases} 1 & mV \leq p \\ ((p-V)/((m-1)V))^k & V < p \leq mV \\ 0 & p < V \end{cases} \quad (2)$$

$$\text{ii) if } m \leq 1, \quad B(p, V, m) = \begin{cases} 1 & mV \leq p \\ 0 & p \leq mV \end{cases}$$

Here in equation (2), m=Qtarget/Qcurrent is the same as that in equation (1). The basic nature of equation (2) is the same as that of equation (1). The difference is that in equation (2), when Qcurrent=Qtarget, those datagrams having preference values higher than V are all discarded, and when Qcurrent becomes higher than Qtarget (when m<1) datagrams whose preference value is larger than mV are all discarded, even if preference value is smaller than V.

Algorithm for such an expression for selection or discard is as follows. Here, rand(0, 1) represents a random number of [0, 1].

```
On receiving packet,
if(V!=0&&Qcurrent!=0) {
    m=Qtarget/Qcurrent;
    if(m*V<p) {
        dropPkt( ); //discard
        return;
    } else if(V<p) {
        if(pow((p-V)/((m-1)*V),k)>rand(0, 1)) {
            dropPkt( );//discard
            return
        }
    }
}
```

What is claimed is:

1. A datagram transfer system, for receiving datagrams sent from individual users' terminals in a datagram transmission node and forwarding said datagrams to a destination address specified on a header of said datagrams, wherein an impact of said datagrams on network operation is evaluated by a traffic monitoring equipment according to traffic information on said datagrams, evaluation results are quantified, and quantified results are converted and are inserted in said header as a preference value, and wherein said datagram transmission node includes a back plane switch section for transferring a datagram from an incoming interface section to an outgoing interface section without causing internal blocking, and a buffer enqueue control section for obtaining the preference value from the datagram received in said outgoing interface section, selecting priority datagrams to be transmitted successively in an ascending order of preference values from a low preference value to a high preference value so as to avoid traffic congestion and entering said priority datagrams in a buffer memory;

wherein said traffic monitoring equipment uses a length field of said datagrams provided in the header of a datagram for inserting the preference value.

2. A datagram transfer system, for receiving datagrams sent from individual users' terminals in a datagram transmission node and forwarding said datagrams to a destination address specified on a header of said datagrams, wherein an impact of said datagrams on network operation is evaluated by a traffic monitoring equipment according to traffic information on said datagrams, evaluation results are quantified, and quantified results are converted and are inserted in said header as a preference value, and wherein said datagram transmission node includes a back plane switch section for transferring a datagram from an incoming interface section to an outgoing interface section without causing internal blocking, and a buffer enqueue control section for obtaining the preference value from the datagram received in said outgoing interface section, selecting priority datagrams to be transmitted successively in an ascending order of preference values from a low preference value to a high preference value so as to avoid traffic congestion and entering said priority datagrams in a buffer memory;

wherein said traffic monitoring equipment computes the preference value based on an inverse of a difference between transmission times of one previous datagram and a current datagram, as well as on lengths of datagrams that has been transmitted or received at corresponding times.

3. A datagram transfer system, for receiving datagrams sent from individual users' terminals in a datagram transmission node and forwarding said datagrams to a destination address specified on a header of said datagrams, wherein an impact of said datagrams on network operation is evaluated by a traffic monitoring equipment according to traffic information on said datagrams, evaluation results are quantified, and quantified results are converted and are inserted in said header as a preference value, and wherein said datagram transmission node includes a back plane switch section for transferring a datagram from an incoming interface section to an outgoing interface section without causing internal blocking, and a buffer enqueue control section for obtaining the preference value from the datagram received in said outgoing interface section, selecting priority datagrams to be transmitted successively in an ascending order of preference values from a low preference value to a high preference value so as to avoid traffic congestion and entering said priority datagrams in a buffer memory;

wherein said traffic monitoring equipment computes an average rate, for use as the preference value, obtained by using a sliding window method of computation based on a length of a datagram and time intervals between transmissions of successive continual datagrams.

4. A datagram transfer system, for receiving datagrams sent from individual users' terminals in a datagram transmission node and forwarding said datagrams to a destination address specified on a header of said datagrams, wherein an impact of said datagrams on network operation is evaluated by a traffic monitoring equipment according to traffic information on said datagrams, evaluation results are quantified, and quantified results are converted and are inserted in said header as a preference value, and wherein said datagram transmission node includes a back plane switch section for transferring a datagram from an incoming interface section to an outgoing interface section without causing internal blocking, and a buffer enqueue control section for obtaining the preference value from the datagram received in said outgoing interface section, selecting priority datagrams to be transmitted successively in an ascending order of preference values from a low preference value to a high preference value so as to avoid traffic congestion and entering said priority datagrams in a buffer memory;

wherein said traffic monitoring equipment computes an average rate during a monitoring period, for use as the preference value, obtained from a length of a datagram and time intervals between transmissions of successive transmissions of continual datagrams.

5. A datagram transfer system, for receiving datagrams sent from individual users' terminals in a datagram transmission node and forwarding said datagrams to a destination address specified on a header of said datagrams, wherein an impact of said datagrams on network operation is evaluated by a traffic monitoring equipment according to traffic information on said datagrams, evaluation results are quantified, and quantified results are converted and are inserted in said header as a preference value, and wherein said datagram transmission node includes a back plane switch section for transferring a datagram from an incoming interface section to an outgoing interface section without causing internal blocking, and a buffer enqueue control section for obtaining the preference value from the datagram received in said outgoing interface section, selecting priority datagrams to be transmitted successively in an ascending order of preference values from a low preference value to a high preference value so as to avoid traffic congestion and entering said priority datagrams in a buffer memory;

wherein said buffer enqueue control section includes the preference value extraction function to obtain a preference value; a preference value comparison function to perform sorting by using said preference value as a sort key; so as to prioritize datagrams in an ascending order of preference values and to enable a buffer enqueue control section to enter datagrams in the buffer memory according to said ascending order of preference values.

6. The datagram transfer system according to claim 5, wherein the preference value is acquired at fixed periodic intervals or at periodic intervals that can be varied according to rates of arrival of datagrams.

7. The datagram transfer system according to claim 5, wherein said buffer enqueue control section judges whether to transmit a datagram prior to entering said datagram in the buffer memory, and if it is judged not to transmit the datagram, said datagram is discarded even if there are vacant memory spaces available, and if it is judged to transmit the datagram, said datagram is entered in said buffer memory.

8. The datagram transfer system according to claim 5, wherein said buffer enqueue control section computes sums of preference values of processed datagrams that have been entered in the buffer memory, computes probability values based on results of summing computation, and discards datagrams according to resulting probability values.

9. The datagram transfer system according to claim 5, wherein said buffer enqueue control section prioritizes the datagrams in the ascending order of preference values, obtains probability values derived from buffer utilization according to said ascending order, and discards datagrams according to said probability values.

10. A datagram transfer system, for receiving datagrams sent from individual users' terminals in a datagram transmission node and forwarding said datagrams to a destination address specified on a header of said datagrams, wherein an impact of said datagrams on network operation is evaluated by a traffic monitoring equipment according to traffic information on said datagrams, evaluation results are quantified, and quantified results are converted and are inserted in said header as a preference value, and wherein said datagram transmission node includes a back plane switch section for transferring a datagram from an incoming interface section to an outgoing interface section without causing internal blocking, and a buffer enqueue control section for obtaining the preference value from the datagram received in said outgoing interface section, selecting priority datagrams to be transmitted successively in an ascending order of preference values from a low preference value to a high preference value so as to avoid traffic congestion and entering said priority datagrams in a buffer memory;

wherein said outgoing interface section prepares a threshold value at a selected timing so that the preference value is obtained from the header of a received datagram so that, based on said threshold value and said preference value, a judgment is made whether or not to transmit said received datagram prior to entering said received datagram in a buffer memory so that if said received datagram is not to be transmitted, said received datagram is discarded even if there are vacant memory spaces available, and if said received datagram is to be transmitted, said received datagram is entered in said buffer memory by a buffer enqueue control section.

11. The datagram transfer system according to claim 10, wherein said judgment conducted prior to entering the datagram in the buffer memory is performed by comparing the threshold value with the preference value of the received datagram so that said received datagram is discarded when said preference value is higher than said threshold value.

12. The datagram transfer system according to claim 10, wherein said judgment, conducted prior to entering the datagram in the buffer memory, is performed by comparing the threshold value with the preference value of the received datagram so that a probability can be computed using a function with input parameters based on a difference between said threshold value and said preference value to determine whether to transmit or not to transmit said received datagram.

13. The datagram transfer system according to claim 11, wherein said buffer enqueue control section includes a preference value storage function for storing time data related to events of either arrival of datagrams within a pre-determined time interval, transfer or discard of datagrams as well as the preference value so as to enable to compute the threshold value based on the preference value.

14. The datagram transfer system according to claim 10, wherein said judgment, conducted prior to entering the datagram in the buffer memory, is performed by computing a probability using a function with input parameters based on the threshold value, the preference value of the received datagram, and a buffer utilization factor or an estimate of buffer utilization so that said received datagram is discarded based on said probability.

15. The datagram transfer system according to claim 14, wherein said judgment, conducted prior to entering the received datagram in the buffer memory, is performed in such a way that all datagrams with preference values higher than a product of the buffer utilization factor or the estimate of buffer utilization and the threshold value are discarded regardlessly, and, failing such a criterion, all datagrams with preference values higher than said threshold value are processed so as to discard those datagrams having high preference values preferentially at a higher probability, and, when said buffer utilization factor or the estimate of buffer utilization is high, to discard those datagrams having high preference values preferentially at a much higher probability.

16. The datagram transfer system according to claim 15, wherein said threshold value, to be used to judge transmission of a datagram, is computed by randomly sampling preference values of arrived datagrams at a selected probability; storing a given number of preference values; and designating a center value of sampled preference values as the threshold value at a selected timing.

17. The datagram transfer system according to claim 15, wherein said threshold value, to be used to judge transmission of the datagram, is computed by randomly sampling preference values of arrived datagrams at a selected probability; storing a given number of preference values; and designating an average value of sampled preference values as the threshold value at a selected timing.

18. The datagram transfer system according to claim 15, wherein said threshold value, to be used to judge transmission of the datagram, is computed by randomly sampling preference values of datagrams selected for transmission at a selected probability; storing a given number of preference values; and designating an average value of sampled preference values as a threshold value at a selected timing.

19. The datagram transfer system according to claim 12, wherein said buffer enqueue control section includes a preference value storage function for storing time data related to events of either arrival of datagrams within a pre-determined time interval, transfer or discard of datagrams as well as the preference value so as to enable to compute the threshold value based on the preference value.

* * * * *